United States Patent
Huang et al.

(10) Patent No.: US 7,876,938 B2
(45) Date of Patent: Jan. 25, 2011

(54) SYSTEM AND METHOD FOR WHOLE BODY LANDMARK DETECTION, SEGMENTATION AND CHANGE QUANTIFICATION IN DIGITAL IMAGES

(75) Inventors: Xiaolei Huang, Bethlehem, PA (US); Xiang Zhou, Exton, PA (US); Anna Jerebko, West Chester, PA (US); Arun Krishnan, Exton, PA (US); Haiying Guan, Baltimore, MD (US); Toshiro Kubota, Lewisburg, PA (US); Vaclav Potesil, Brno (CZ)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1149 days.

(21) Appl. No.: 11/542,477

(22) Filed: Oct. 3, 2006

(65) Prior Publication Data

US 2007/0081712 A1    Apr. 12, 2007

Related U.S. Application Data

(60) Provisional application No. 60/724,335, filed on Oct. 6, 2005, provisional application No. 60/724,379, filed on Oct. 7, 2005, provisional application No. 60/724,531, filed on Oct. 7, 2005, provisional application No. 60/725,995, filed on Oct. 12, 2005, provisional application No. 60/738,826, filed on Nov. 22, 2005, provisional application No. 60/791,836, filed on Apr. 13, 2006, provisional application No. 60/795,659, filed on Apr. 27, 2006, provisional application No. 60/833,341, filed on Jul. 26, 2006.

(51) Int. Cl.
G06K 9/00 (2006.01)
G06K 9/62 (2006.01)

(52) U.S. Cl. ............... 382/128; 382/131; 382/159

(58) Field of Classification Search .......... 382/128, 382/131, 154, 155, 159
See application file for complete search history.

(56) References Cited

U.S. PATENT DOCUMENTS

| 6,320,976 | B1  | 11/2001 | Murthy et al. |
| 2003/0120147 | A1* | 6/2003 | Kuth et al. ............ 600/410 |
| 2005/0010445 | A1* | 1/2005 | Krishnan et al. ............ 705/2 |
| 2006/0120572 | A1* | 6/2006 | Li et al. ............ 382/118 |
| 2006/0171586 | A1* | 8/2006 | Georgescu et al. ......... 382/173 |

OTHER PUBLICATIONS

Van Ginneken et al., "Segmentation of anatomical structures in chest radiographs using supervised methods: a comparative study on a public database", Medical Image Analysis, Oxford University Press, Oxford, GB, vol. 10, No. 1, May 24, 2005, pp. 19-40.

(Continued)

*Primary Examiner*—John B Strege

(57) ABSTRACT

A method for segmenting digitized images includes providing a training set comprising a plurality of digitized whole-body images, providing labels on anatomical landmarks in each image of said training set, aligning each said training set image, generating positive and negative training examples for each landmark by cropping the aligned training volumes into one or more cropping windows of different spatial scales, and using said positive and negative examples to train a detector for each landmark at one or more spatial scales ranging from a coarse resolution to a fine resolution, wherein the spatial relationship between a cropping windows of a coarse resolution detector and a fine resolution detector is recorded.

11 Claims, 17 Drawing Sheets

OTHER PUBLICATIONS

Sajda et al., "Learning Contextual Relationships in Mammograms Using a Hierarchical Pyramid Neural Network", IEEE Transactions on Medical Imaging, IEEE Service Center, Piscataway, NJ, US, vol. 21, No. 3, Mar. 2002, pp. 239-250.

Sung et al., "Example-Based Learning for View-Based Human Face Detection", IEEE Transactions on Pattern Analysis and Machine Intelligence, IEEE Service Center, Los Alamitos, CA, US, vol. 20, No. 1, Jan. 1998, pp. 39-50.

\* cited by examiner

Landmark detection results on PET images. Both training and detection are done using PET data only. (1) detected shoulder landmarks. (2) detected upper-lung-corner landmarks. (3) detected lower-lung-corner landmarks.

Detecting an anatomical region: shoulder/neck/upper-lung. The white box shows the 3D bounding box of the detected region in each image.

(1): Right-kidney-center detection results are shown.
(Detected kidney center is marked by a white cross.)

Detection results of left and right kidneys in whole-body CT images. In each picture, the 3D bounding boxes of both left and right kidneys are drawn.

The FDG uptake in lung and abdomen (a) Neck pattern  (b) Lung pattern  (c) Recognition HMM training and recognition a) Original tumor image.
b) Results of Gussian fitting to intensity distribution on a linear cross-section of the tumor image.

Nonlinear transfer function

SYSTEM AND METHOD FOR WHOLE BODY LANDMARK DETECTION, SEGMENTATION AND CHANGE QUANTIFICATION IN DIGITAL IMAGES

CROSS REFERENCE TO RELATED UNITED STATES APPLICATIONS

This application claims priority from: "Method and Apparatus for Automatic Threshold Selection and Segmentation of 'hot-spots' in PET Images", U.S. Provisional Application No. 60/724,335 of Anna Jerebko, filed Oct. 6, 2005; "Method and Apparatus for Abnormality Detection in PET Images using a Probability Map of "Normal" Bright Spots in Normal Patients", U.S. Provisional Application No. 60/724,379 of Anna Jerebko, filed Oct. 7, 2005; "Method and Apparatus for Hot-spot Segmentation and Change Quantification in PET and/or PET/CT Images", U.S. Provisional Application No. 60/724,531 of Huang, et al., filed Oct. 7, 2005; "Method and Apparatus for Mode-seeking Region Growing with Application to Hot-spot Segmentation in PET Images", U.S. Provisional Application No. 60/725,995 of Huang, et al., filed Oct. 12, 2005; "Method and Apparatus for a Computer System For Automatic Hot-spots Detection and Segmentation in PET images", U.S. Provisional Application No. 60/738,826 of Guan, et al., filed Nov. 22, 2005; "A Learning-based Framework for Whole-body Landmark Detection and it's Applications in CT, MR, PET and CT Images", U.S. Provisional Application No. 60/791,836 of Huang, et al., filed Apr. 13, 2006; "Method and Apparatus for a Learning-based Framework for Whole-body Landmark Detection and its Applications in CT, MR, PET and PET/CT Images", U.S. Provisional Application No. 60/795,659 of Huang, et al, filed Apr. 27, 2006; and "Automated Multi-Modal Object Segmentation", U.S. Provisional Application No. 60/833,341 of Huang, et al., filed Jul. 26, 2006, the contents of all of which are incorporated herein by reference.

TECHNICAL FIELD

This invention is directed to learning-based framework for whole-body landmark detection, segmentation, and change quantification in single-mode and multi-mode medical images.

DISCUSSION OF THE RELATED ART

Positron emission tomography (PET) using fluorine-18 deoxyglucose (FDG) is a nuclear medicine medical whole-body imaging technique that produces a three dimensional image of functional processes in the body. The assessment of tumor size and volume is important for patient prognosis as well as for evaluation of treatment effectiveness and follow up. Tumors in FDG-PET appear as "hot-spots" due to increased FDG uptake. These hot-spots typically lack well-defined edges, and therefore the choice of viewing window level or intensity threshold results in highly variable tumor delineation. While tumor size is an important prognosis factor, both manual and automatic tumor delineation and segmentation accuracy and variability is an issue. By late 1990s, a large body of literature have clearly shown that FDG-PET imaging is essential and effective for detection, diagnosis and prognosis of tumors. It is also shown applicable to neurological disorders and coronary artery disease.

PET and other imaging modalities such as CT, MRI and SPECT provide exquisitely detailed in vivo information regarding the anatomy and physiological function of specific subjects. However, the interpretation of data has often been hindered by the inability to relate such information to specific anatomical regions. The difficulty lies in the intrinsic large variations in anatomy; while normal anatomy from subjects vary, the variations are magnified in the condition of disease or abnormality. In the context of whole-body CT, MRI, PET or PET/CT images, there is a desire to: (1) specify generally the global anatomical relationship between anatomical structures; (2) represent the variations of particular anatomical structures or landmarks in populations; and (3) map the general representation to an individual anatomy and robustly label specific anatomical regions, organs or landmarks.

In the literature, there have been reported algorithms designed to recognize particular anatomical structures so as to segment a volume into sub-volumes, each of which corresponds to an anatomical region, organ or structure. For instance, in torso CT images, hierarchical image processing pipelines have been proposed to automatically recognize and segment the skin, fat, muscle, bone, and internal organs such as lung, heart, and liver. The image processing techniques utilized in the pipelines include gray-level thresholding, region growing, density and distance feature classification, and tree-structured encoding of spatial relations between different organs and tissue regions. In one validation study, when the system was applied to 139 cases, the skin, fat, muscle and skeleton regions were recognized correctly in 93% of the cases. In another study with 334 patient cases, the hierarchical pipeline provided satisfied recognition results for tissue regions and internal organs in 70% of the cases. From these results, it can be seen that the performance of these previous systems is not yet good enough for clinical use. Furthermore, since these methods are mostly rule-based and explicitly use knowledge about specific organs or tissues in torso CT images, they are not easily adaptable to other imaging modalities such as PET and MRI, and to recognize a new anatomical structure of interest, a completely new image processing pipeline is required to be developed. In some cases, if an internal structure of interest is small and exhibits large variations in the population, such as the kidneys, it may not be possible to develop a specific image-processing pipeline to target them at all. For example, the spatial contexts of the kidney can differ: in some cases the kidney is closely attached to the liver, while in other cases it is separate from the liver. The relative position and orientation of the kidney with respect to the liver and spine also vary.

It is expected that the number of FDG-PET images performed will exceed all other procedures performed with radioactive compound in the coming years. As the amount of PET data generated every day increases, the burden on radiologists in reading and diagnosing these cases increases. This may result in a negative effect, as the rate of overlooking anomalies can increase due to fatigue, and the risk of over-diagnosis may also rise. Computer-aided detection (CAD) tools have constantly demonstrated effectiveness in supplementing the task of radiologists, as they improve the sensitivity of anomaly detection and reduce the interpretation variation among radiologists. Currently, there are no known commercially available CAD tools for FDG-PET images.

Previous work on PET image studies have been presented in both clinical studies and medical image processing. From a clinical perspective, the main challenge in hot-spot detection and segmentation is that normal tissues also uptake different levels of FDG. There is a great variance in the normal physiology of FDG uptake. For example, FDG is cleared primarily through the renal system. Thus, the normal bladder might have the highest FDG uptake organ. The brain also has a high FDG uptake. The heart and bowel have varying levels of FDG uptake. Liver, bone marrow and spleen sometimes also have mildly high FDG uptake, which is higher than some tumors. Considering all these normal tissue uptakes, the intensity range of the normal tissue overlaps with the tumors significantly. In addition, the shape, size, and location of tumors are unpredictable.

From a medical image processing perspective, there are further challenges in hot-spot detection and segmentation. First, whole-body PET images usually have low resolution, typically 5-10 mm, much lower than CT, whose resolution can be in the sub-millimeter level. Second, the intensity range of PET images is large, and intensity values of a PET image heavily depends on the clinical factors, such as applied radiopharmaceutical injection dose and time, and patient factors, such as body weight and the tissue uptake.

Tumors in PET images appear as high-uptake hot-spots, and segmentation algorithms apply thresholds that relate to the maximum SUV value. Most approaches to hot-spot segmentation and the quantitative measurement of tumor volume use the standard uptake value (SUV), which is a semi-quantitative normalization of the FDG uptake PET image and measures the FDG concentration normalized by decay corrected injection dose per gram body mass. Physicians and radiologists have used this measure for normalization across time points for different patients, and the maximum SUV values are used for grading tumors.

To find the boundary of hot-spots, one popular approach is to apply thresholding to the normalized SUV image. Clinical studies have shown that SUV values above 2.5 (some studies show 1.9 or 2.0) correspond to FDG uptake that is higher than the uptake by normal muscular activity. However, a global thresholding method with a fixed threshold often does not work well in practice, because some organs induce high FDG uptake but correspond to normal physiology. In particular, brain, heart, kidney, and bladder (the renal system) usually show up as hot-spots in PET images; liver, bone marrow, spleen, bowel sometimes also have mildly high FDG uptake that easily exceeds the 2.5 threshold. However, accurate hot-spot detection and precise tumor volume quantification remain largely unsolved, due to intrinsic imaging pitfalls and artifacts in PET and the lack of ground truth for validating proposed algorithms.

A new technology, PET/CT, combines the functional imaging PET with an anatomical imaging computed tomography (CT), and allows the acquisition of clinical quality PET and CT scans, accurately aligned, from a single imaging device. On a fused PET/CT image, abnormalities that are seen on PET can be located, and possibly also confirmed, on CT, and this enables the interpreting physician to make a more informed decision about whether the hot-spot on PET is indeed an abnormality, and if so, where the abnormality is located anatomically. Retrospective studies performed with PET/CT prototypes showed considerable promise, particularly in the areas of disease staging and therapy planning and monitoring.

There has also been a large body of work on change detection and visualization through rigid/nonrigid registration and fusion of image volumes, for a same patient from different time points or for different patients. In particular, prior research has focused on registration and fusion to compensate for movements/deformations due to patient positioning, physiological organ motion, or structural changes as a result of disease progression or remission. These registration methods have demonstrated success in correcting organ (such as breast, lung, liver) motion. However, methods and systems that rely solely on registration, especially those involving nonrigid registration, are not robust in the context of whole-body imaging such as in PET, PET/CT, because the deformations are usually large due to changes in patient positioning, articulated motion, etc., the number of variables to be recovered tend to be much larger than the number of available constraints, and computational costs are high.

Currently, tumor segmentation in PET is performed manually by the physician or semi-automatically using fixed thresholding in a region of interest, usually defined as 40% of the maximum SUV value in the region. Un-supervised object segmentation involves a trade-off between sensitivity and specificity. Robust and accurate delineation of object boundaries remains a challenge, especially when noisy and low-resolution data such as PET images are involved. Current systems involving manual or semi-automatic object segmentation require significant user interaction. In clinical practice, this presents an additional burden on the physician and limits the patient throughput. Moreover, manual object delineation has been shown to be less reproducible as compared to fully automated segmentation. This is particularly important for quantitative tumor measurements. In cancer imaging, a second modality such as CT can often provides better resolution and object delineation. However, the difference in attenuation between tumor and healthy tissue in CT is low and segmentation algorithms often fail when used on CT data alone.

SUMMARY OF THE INVENTION

Exemplary embodiments of the invention as described herein generally include methods and systems for discriminative learning-based framework that uses databases to guide the modeling and detection of landmarks (such as landmarks on the liver, kidney, lung, or bones) in whole-body CT, MRI or PET images, and an automatic method for determining the intensity threshold for hot-spot segmentation in PET images. Additional exemplary embodiments include a novel body-section labeling module based on spatial Hidden-Markov Models (HMM) to allow different processing policies to be applied in different body sections, a Competition Diffusion (CD) segmentation algorithm, which takes into account body-section information, and which converts the binary thresholding results to probabilistic interpretation and detects hot-spot region candidates, a recursive intensity mode-seeking algorithm that finds hot-spot centers efficiently, and given these centers, a clinically meaningful protocol to accurately quantify hot-spot volumes. Further exemplary embodiments include a CAD algorithm for automatically detecting suspicious volumes-of-interest (VOI) to the radiologist, an algorithm for bone segmentation based on PET-CT registration, and an algorithm for body context interpretation, which includes two components, body segmentation and body section labeling. Other exemplary embodiments include a multimodal object segmentation (MMOS) that uses an initial segmentation based on data from one imaging modality to learn a model of the object that using data from additional modality (ies) to improve the overall segmentation result. More accurate and reproducible object delineation can be achieved as a result without the need for user intervention.

According to an aspect of the invention, there is provided a method for segmenting digitized images including providing a training set comprising a plurality of digitized whole-body images, each image comprising a plurality of intensities corresponding to a domain of points on an 3-dimensional grid, providing labels on anatomical landmarks in each image of said training set, aligning each said training set image, generating positive and negative training examples for each landmark by cropping the aligned training volumes into one or more cropping windows of different spatial scales, and using said positive and negative examples to train a detector for each landmark at one or more spatial scales ranging from a coarse resolution to a fine resolution, wherein the spatial relationship between a cropping windows of a coarse resolution detector and a fine resolution detector is recorded.

According to a further aspect of the invention, the training set images are aligned to a common target volume.

According to a further aspect of the invention, the method comprises testing said detector on a validation set of digitized whole-body images, wherein false positives are added into the negative training set and false negatives are added into the positive training set, wherein said detector is re-trained using said positive and negative examples.

According to a further aspect of the invention, the method comprises providing a new digitized image and a set of search window parameters and using at least one of said detectors to search for its associated landmark in said new image, and classifying the sub-volume within the search window as either as positive example that contains said landmark, or a negative example that does not contain said landmark.

According to a further aspect of the invention, a positive training example is generated by cropping a largest size landmark neighborhood to train a coarse-level detector, training a succession of higher resolution detectors on a succession of decreasing sized neighborhoods centered at the landmark.

According to a further aspect of the invention, a negative training example is generated by pre-selecting a sample from a training volume at each resolution for which a positive example is generated, wherein pre-selecting includes one or more of cropping a training volume at a location not centered on an anatomical landmark, cropping sub-volumes of a training volume at different spatial scales, and rotating a sub-volume.

According to a further aspect of the invention, aligning each training set image to a common target volume further comprises calculating transformations based on landmark correspondences, wherein a higher weight is given to those landmarks with less size and shape variability among the anatomical landmarks labeled in the training set.

According to another aspect of the invention, there is provided a method for quantifying changes across sub-volumes of digitized images including providing a plurality of new digitized images, said images representing a same patient at different time points, selecting a point in a sub-volume of interest in each of said plurality of images, segmenting said sub-volume of interest in each image, and quantifying changes in the sub-volume of interest over the different images of one or more properties including intensity, volume, shape, topology, location, and texture.

According to a further aspect of the invention, the digitized images include positron emission tomography images and single photon emission computed tomography images.

According to a further aspect of the invention, the method comprises manually adjusting said segmentation results.

According to a further aspect of the invention, the point in said sub-volume of interest is manually selected in a first of said succession of images, and further comprising extracting a region containing said sub-volume of interest, for each succeeding image, extracting a plurality of regions, each region containing a sub-volume, calculating a likelihood that each sub-volume corresponds to the manually selected sub-volume, and selecting the maximum likelihood sub-volume in each succeeding image as the sub-volume that corresponds to the manually selected sub-volume of interest.

According to a further aspect of the invention, the points in said sub-volumes of interest in each of said plurality of images are automatically selected based on statistics of landmark appearances, landmark detection, determining the organ context of said sub-volumes, and a statistical classification of said sub-volume as being normal or abnormal, and further comprising establishing links between corresponding sub-volumes in each of said succession of images.

According to a further aspect of the invention, segmenting said sub-volume of interest further comprises setting said selected point in said sub-volume as a current point, selecting a set of neighboring points connected to said current point, selecting from said set of neighboring points a new point with a maximum associated value, wherein if said new point is not the current point, resetting said current point to be said new point, and repeating said steps of selecting a set of neighboring points and selecting a point with a maximum associated value until said new point is the same as said current point.

According to a further aspect of the invention, the method comprises computing a segmentation threshold value, setting a seed point as said new point with said maximum associated value in said set of neighboring points, initializing a set of points in a segmentation mask, selecting those neighbors of said seed point whose associated value exceeds said threshold as being included in said sub-volume, for each point included in said sub-volume, selecting those neighbors whose associated value exceeds said threshold as being included in said sub-volume, marking those points included in said sub-volume in said segmentation mask with a first value and those points not included in said sub-volume in said segmentation mask with a second value, wherein a boundary for said sub-volume includes those points with a first value in said segmentation mask that are adjacent to a point with a second value in said segmentation mask.

According to another aspect of the invention, there is provided a method for segmenting digitized images including providing a digitized whole-body image, said image comprising a plurality of intensities corresponding to a domain of points on an 3-dimensional grid, calculating one or more characteristic feature functions of said body for each axial slice in said image, and analyzing said one or more characteristic feature functions to label the body slices according to their anatomical regions.

According to a further aspect of the invention, analyzing said characteristic feature functions comprises, providing an anatomical model for each anatomical region by maximizing a likelihood probability function Pr(Observed|Model) on training samples for the characteristic feature function in each anatomical region, computing the probability function Pr(Observed|Model) in a window that slides along the ordinate axis of the characteristic feature function to locate a sub-region that maximizes said probability function, wherein the sub-region of the maximum likelihood value with respect to each anatomical model is the associated anatomical region.

According to a further aspect of the invention, the method comprises extracting a sub-region from said anatomical region with abnormal intensity values, initializing each point in said sub-region by transforming the intensity value of each point into probability values $x_1$, $x_2$ of the point belonging to a normal sub-region or an abnormal sub-region; forward integrating $x_1$, $x_2$ according to $\dot{x}_i = x_i(f_i - \bar{f}) + \mu \nabla^2 x_i$, wherein $\dot{x}_i$ is a time derivative of $x_i$, $f_i$ is a fitness measure associated with $x_i$, $$\bar{f} = \sum_i x_i f_i$$

is an average fitness, and μ is a pre-determined constant, until each point has one dominant probability, wherein the probability of the dominant state is assigned to extract the sub-region.

According to a further aspect of the invention, the characteristic feature include a centroid of each axial slice and a mean intensity of each slice.

According to a further aspect of the invention, the anatomical regions include the neck, lungs, and torso.

According to another aspect of the invention, there is provided a method for segmenting digitized images including providing a training set comprising a plurality of digitized whole-body images, each image comprising a plurality of intensities corresponding to a domain of points on an 3-dimensional grid, providing contours to delineate anatomical landmarks on said training images, fitting each delineated anatomical landmark to a Gaussian function and determining a distance d from the center of each said Gaussian to said contour from d=K % c, wherein c is the width of the Gaussian, and averaging K across all slices of all training images, wherein a segmentation threshold for said anatomical landmark is determined from a Gaussian function of (b−Kc), wherein b is a centroid location.

According to a further aspect of the invention, the method comprises fitting Gaussians of different scales by extracting sub-volumes containing said anatomical landmark of different sizes, and selecting an optimum size for said Gaussian fitting by selecting a sub-volume containing points whose intensities are within pre-defined percentage limits.

According to a further aspect of the invention, the method comprises calculating a probability map of point intensities from said set of aligned training images acquired from healthy and unhealthy patients, wherein said probability map estimates the probability of each point as belonging to normal or abnormal tissue, creating a model image from said set of aligned training images, providing a new digitized image, aligning said new image to said model image by registering bright spots in said model image to bright spots in said new image, wherein bright spots in said new that cannot be mapped to corresponding bright spots in said model image are labeled as abnormal candidates, and determining the probability of points in said abnormal candidates as bing abnormal from said probability map.

According to a further aspect of the invention, the probability map is a 2-dimensional map based on intensity projections on the coronal plane.

According to another aspect of the invention, there is provided a method for joint segmentation of a region of interest in a plurality of images, including providing a plurality of digitized images acquired through differing modalities at the same clinical time point of a same patient, each said image comprising a plurality of intensities corresponding to a domain of points on an 3-dimensional grid, segmenting a region-of-interest in a first of said plurality of images, propagating said segmented region of interest to the rest of said plurality of images based on the spatial relationship between said first image and the rest of said plurality of images, and updating the segmentation in each of the rest of said plurality of images according to one or more of spatial or intensity features in each of the rest of said plurality of images.

According to a further aspect of the invention, the method comprises morphologically eroding a first segmentation mask corresponding to said segmented region-of-interest in said first of said plurality of images, wherein a segmented mask containing only abnormal points is obtained, morphologically dilating and logically complementing said first segmentation mask wherein a segmented mask containing only normal points is obtained, obtaining a non-parametric probabilistic model of tumor tissue attenuation in a second modality image in said plurality of images from said segmented tumor mask, obtaining a non-parametric statistical model of the background tissue attenuation from said segmented normal mask, normalizing intensity values in said first modality image wherein a likelihood map of abnormal activity is obtained, and measuring a probability of an image point as being abnormal tissue from a likelihood ratio test, wherein a point probability value greater than 1 indicates that said point represents abnormal tissue.

According to another aspect of the invention, there is provided a program storage device readable by a computer, tangibly embodying a program of instructions executable by the computer to perform the method steps for segmenting digitized images.

DETAILED DESCRIPTION OF THE PREFERRED EMBODIMENTS

Figure 1:
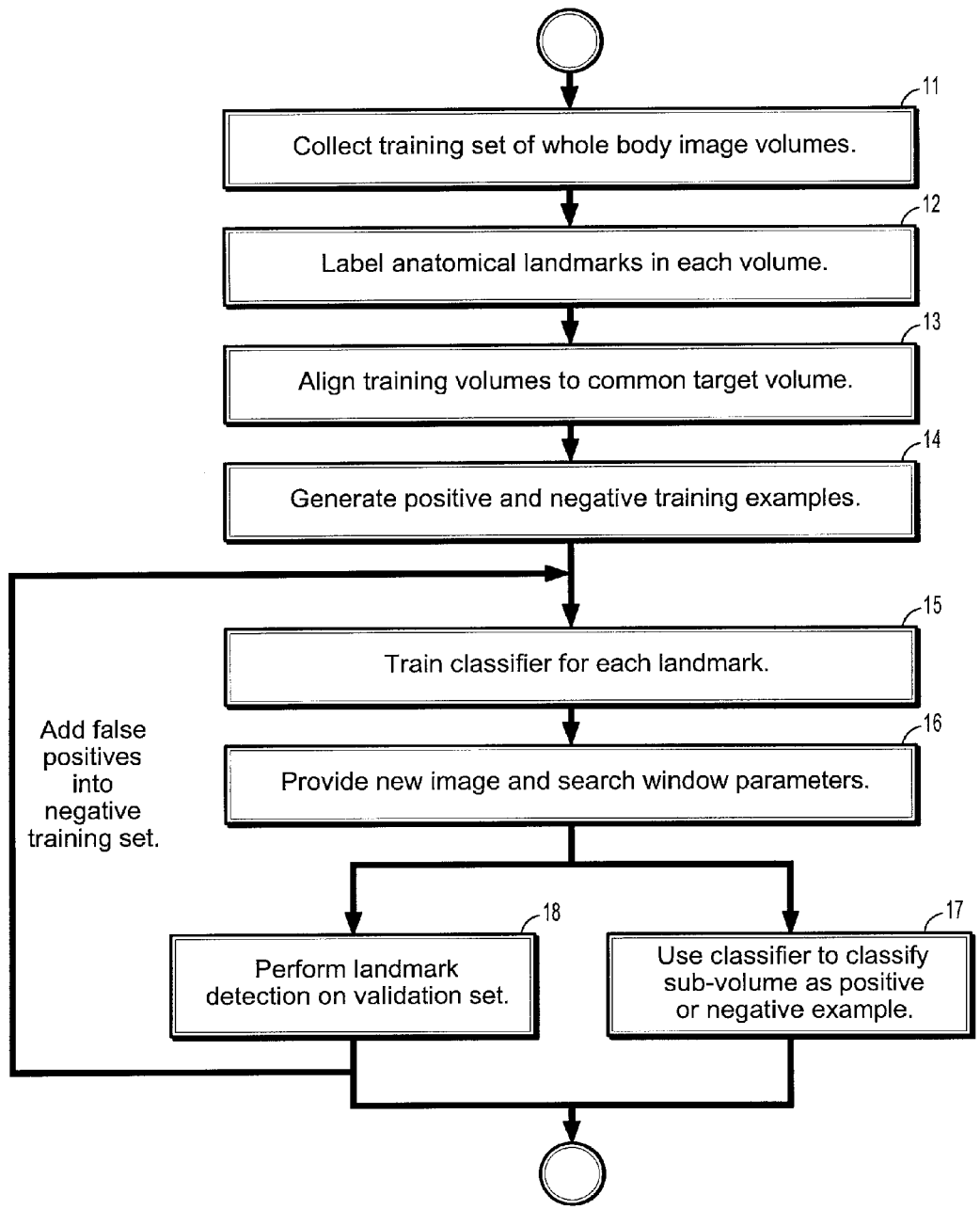
FIG. 1 is a flow chart of a learning-based framework for whole-body landmark training and detection according to an embodiment of the invention.

Exemplary embodiments of the invention as described herein generally include systems and methods for whole-body landmark detection, segmentation, and change quantification in single-mode and multi-mode medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Learning-Based Framework for Whole-Body Landmark Detection

According to an embodiment of the invention, a learning-based framework detects and recognizes anatomical landmarks, or organs of interest. A learning-based landmark detection framework utilizes a database of images, from which a learning algorithm can extract representations of the variations in particular anatomical structures as well as in the global anatomical relationship between structures. A method according to an embodiment of the invention starts with collecting whole-body volumes as training data, and in each training volume, manually labeling the interested landmarks. In order to learn a discriminative classifier for a particular landmark, the training volumes are first aligned to a common target using a weighted-alignment algorithm, which gives the landmark of interest higher weights than other landmarks. Having the aligned volumes, data centered around the landmark of interest are cropped to generate positive examples that contain the landmark, and data are cropped randomly elsewhere in the training volumes to generate negative examples. A discriminative classifier using a Cascaded AdaBoosting technique is learned using the database of positive and negative training examples. To train coarse-to-fine classifiers, coarse-to-fine cropping is used to generate positive and negative examples at multiple scales.

At run-time, a new whole-body volume is scanned and for each candidate search window, the classifier is applied for a particular landmark, organ, or anatomical region to determine whether the sub-volume inside the search window is a positive example of that landmark, organ or anatomical region. The positive detections are returned as potential detection results. The detected windows are also ranked based on their response, and the window with the highest response value has the highest likelihood of being the detected landmark in the novel whole-body volume. A coarse-to-fine scheme and geometric constraints between landmarks can also be implemented to improve the robustness of the detection method. In order to exploit geometric constraints between landmarks to improve detection performance, one can implement a multi-object or multi-landmark simultaneous detection system that detects multiple landmarks simultaneously and use the geometric constraints between them to eliminate false detections.

The end result of the framework is that, given a new image volume of any modality, one can run the system to automatically detect any landmark whose detector (i.e. discriminative classifier) has been trained previously using a database of images of the same modality. To achieve this goal, there are two main steps: training and detection.

A flow chart of a learning-based framework for whole-body landmark training and detection according to an embodiment of the invention is shown in FIG. 1. There is a common algorithmic framework and system engine for the training step. To train classifiers for landmarks at different anatomical locations, or on images of different modalities, one can use common training software, the only difference being in the image database that is used as training data. Hence the training framework is generic in that it is highly adaptable, and it can be used to train classifiers (or detectors) of any anatomical landmark, organ, or tissue region in any medical imaging modality that images the human body, either whole-body or regional.

Referring now to the figure, a training process according to an embodiment of the invention starts at step 11 by collecting whole-body image volumes as training data. The imaging modalities could be CT, MRI, PET, PET/CT or others. In the case of PET/CT, a pair of PET and CT volumes is pre-registered in a global coordinate system. At step 12, anatomical landmarks are manually labeled in each training volume. For example, landmarks can be marked in 3D for lung corners, liver tips, kidney center or tips, heart, bladder, bone intersections, etc. In the case of organ or tissue detection, boundaries of the organs or tissue regions of interest can be manually delineated. At step 13, all training volumes are aligned to a common target volume by solving transformations based on landmark correspondences. According to an embodiment of the invention, a weighted-alignment algorithm is used that considers all the landmark correspondences, but gives higher weights to landmarks whose discriminative classifier is currently being trained. In the weighted-alignment algorithm, the weights to different landmarks can be computed using an algorithm which evaluates the "goodness" or "stableness" of each landmark. The good and stable landmarks that have less variations in the training set, as compared to the variance of the mean size and shape over the training set of the landmarks, are given high weights, while "volatile" landmarks that vary a lot in populations are given low weights.

Positive and negative training examples are generated at step 14 for landmarks of interest by cropping the aligned training volumes. For positive examples, in a coarse-to-fine approach, landmark neighborhoods can be defined with increasing sizes. Cropping centered at the landmark can be performed in a hierarchical coarse-to-fine manner. First, the largest-size landmark neighborhood (e.g. thorax, abdomen, torso, etc.) is cropped to train a coarse-resolution detector. Then, inside the coarse-level neighborhood, smaller and smaller neighborhoods centered at the landmark (e.g. at the organ level: kidney/liver/heart/lung; then at the landmark vicinity level: lung corners, kidney center, etc.) are cropped to train higher resolution detectors with increasing localization accuracy. For the negative examples, at each resolution that a set of positive examples is generated, negative examples are both pre-selected and randomly selected from the training volumes at that resolution. The pre-selected negative examples can be representative and comprehensive and can cover scale, translation and rotation variations. For instance, negative examples can be generated by cropping the volumes at locations that are not centered at the landmarks of interest, or by cropping sub-volumes with different scales, or by rotating the sub-volumes.

Given the training examples, a discriminative classifier can be trained at step 15 for each landmark at every scale. A learning algorithm according to an embodiment of the invention is a AdaBoost cascade training algorithm, that in each cascade, uses 3D features to choose the best primitive features that will differentiate positive examples from negative examples. An AdaBoost algorithm according to an embodiment of the invention implements Coarse-to-fine training, where coarse-to-fine classifiers are trained at multiple scales for a landmark. The spatial relationship between cropping windows of finer-scale classifiers and that of coarser-scale classifiers are also recorded.

A detection framework and implementation according to an embodiment of the invention is usable in essentially all detection situations. To detect a particular landmark on a new image, the inputs are: (1) the discriminative classifier for that landmark learned on a database of images of the same modality; (2) the new image; and (3) the search window parameters. Referring again to FIG. 1, the inputs are provided at step 16. The common detection software, i.e. the discriminative classifier, is used at step 17 to scan (or search) through the new volume, and for each candidate search window, the discriminative classifier is applied to classify the sub-volume inside the search window to be either a positive example that contains and centers at the landmark or a negative example that does not contain or center at the landmark. If the classifier outputs a response (or likelihood) value, the candidate window with the highest response (or likelihood) is chosen as the detected landmark in the new volume. If a coarse-to-fine multi-scale classifier is provided, a coarse-to-fine detection is applied, which first detects a large neighborhood using a coarse-level classifier, then within the coarse-level window, applies finer-level classifiers to localize the landmark with increasing accuracy. Landmark detection can also be done on a validation set at step 18. Since there is ground truth on the validation set, the detection results can be organized into the following categories: (1) false positives; (2) false negatives; (3) true positives; and (4) true negatives. A bootstrap scheme is then implemented to add the false positives (FPs) into the negative training set, and the false negatives (FNs) into the positive training set, after which the classifiers for the landmark are re-trained using the updated training example sets.

Figure 2:
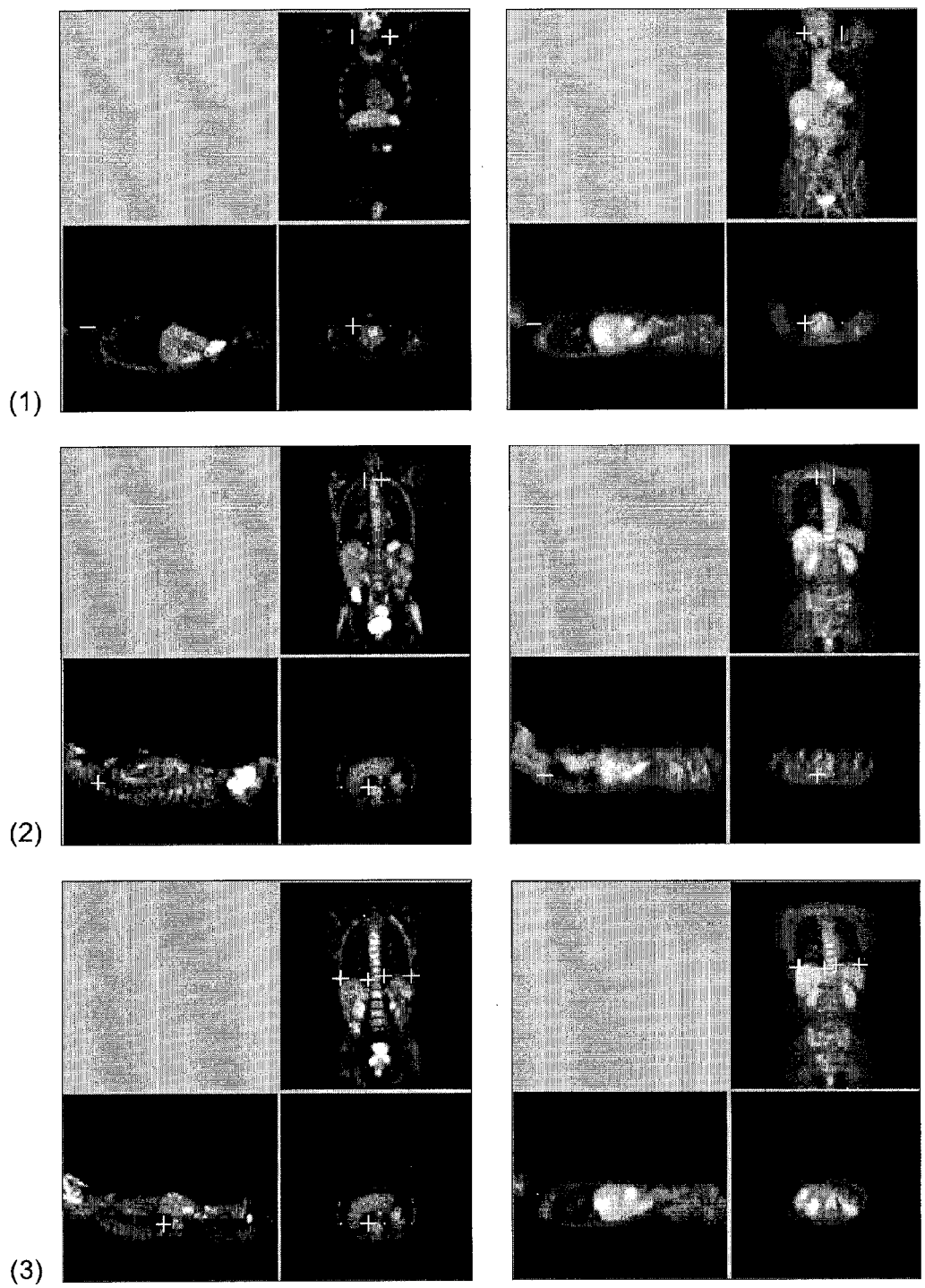
FIGS. 2(a)-(c) depict results of detecting whole-body landmarks or anatomical regions in PET images, according to an embodiment of the invention

The learning-based framework described in the invention can be directly applied to PET images to detect whole-body landmarks or anatomical regions in PET. FIGS. 2(a)-(c) below shows some example results. Both training and detection were performed using PET data only. In this example, the training set has 20 whole-body PET volumes and manually annotated whole-body landmarks. Classifiers were trained on 2 landmarks around the shoulder and 6 landmarks around lung corners. Given two novel volumes, FIG. 2(a) shows detected shoulder landmarks. FIG. 2(b) shows detected upper-lung-corner landmarks. FIG. 2(c) shows detected lower-lung-corner landmarks.

Figure 3:
FIG. 3 depicts results from a shoulder/neck/upper-lung detection in whole-body CT images, according to an embodiment of the invention.

A general learning-based framework according to an embodiment of the invention for detecting anatomical landmarks, organs or anatomical regions can be used in many whole-body image analysis applications. One such application is whole-body tagging and context understanding. Computer-aided or automated exploration and interpretation of a whole-body volume can benefit from tagging the anatomical landmarks, organs, tissue regions or sections in whole-body volumes. To apply a computer-aided diagnosis (CAD) system to lung nodule detection, one needs to detect the lung region first; to apply CAD on colon polyp detection, one needs to find the image slices containing the colon first; to detect whole-body metastatic spread in bones, one needs to find the bones first; to detect and characterize tumor involvement of lymph nodes, one may want to detect great vessels, since lymph nodes appear near these structures. Hence a first step to automatic interpretation of whole-body structure and function is to know the anatomical context. An anatomical landmark detection framework according to an embodiment of the invention can be used for this purpose, since it is a generic framework that can be used to detect any anatomical region, organ, landmarks, tissue regions, or sections in whole-body volumes. FIG. 3 depicts results from a shoulder/neck/upper-lung detection example in whole-body CT images. The white box shows the 3D bounding box of the detected region in each image.

Figure 4:
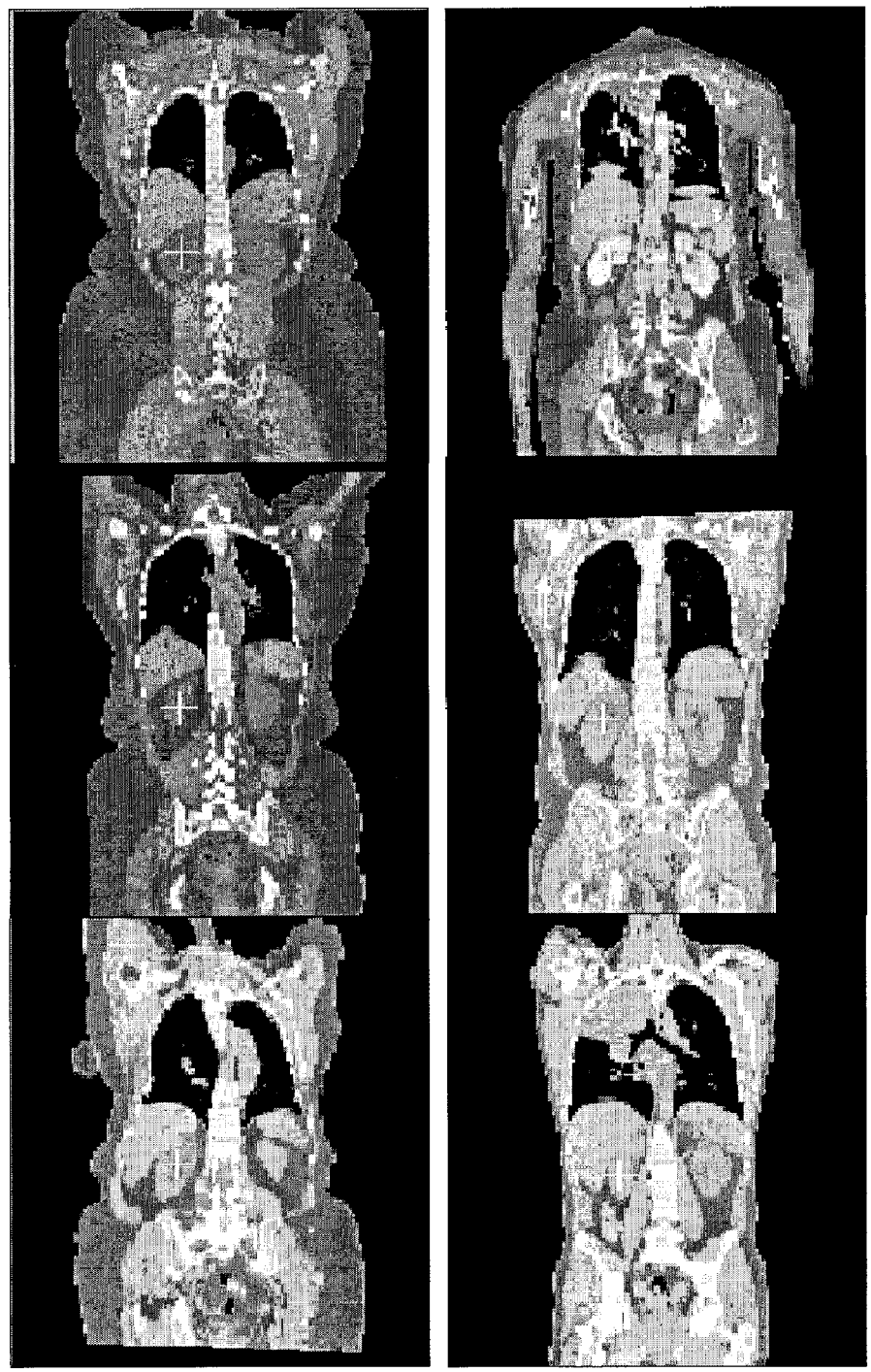
FIG. 4 shows results from a right-kidney-center detection example, according to an embodiment of the invention
Figure 5:
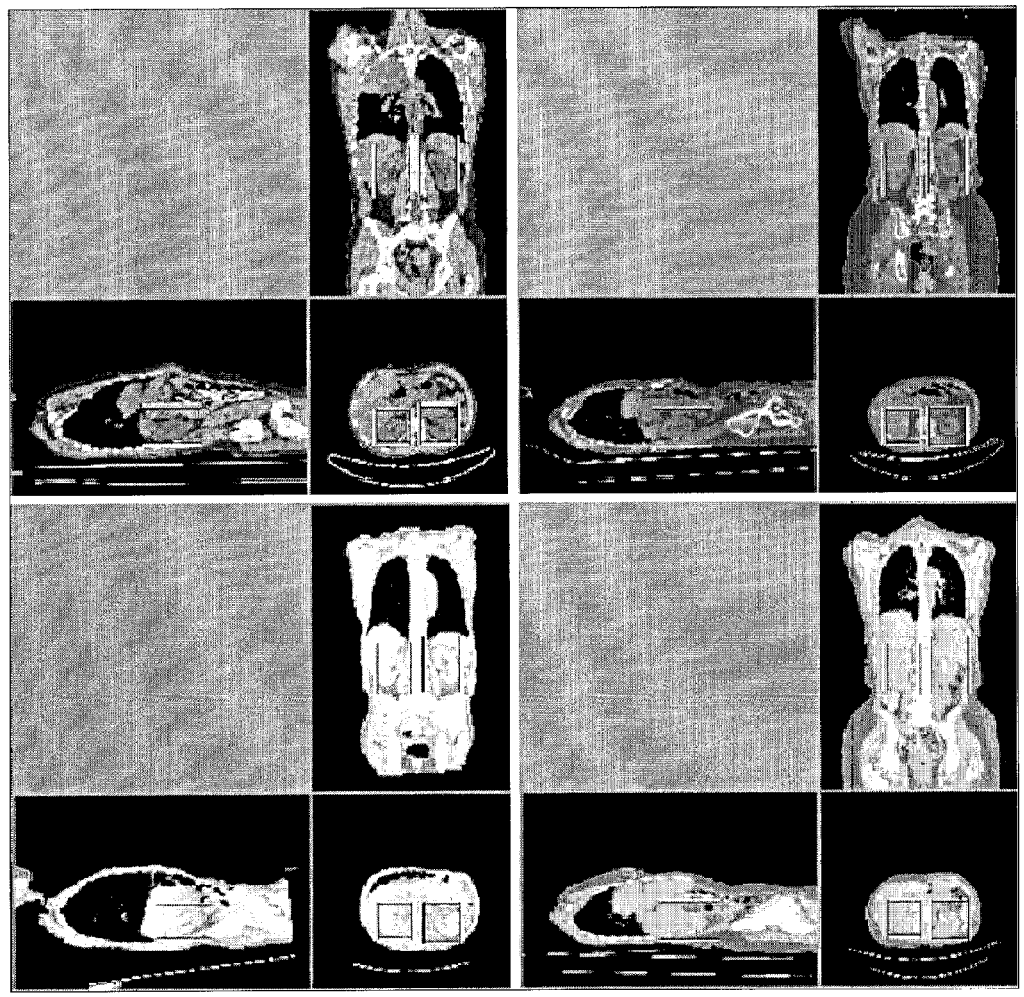
FIG. 5 shows different views of detection results from left and right kidneys in whole-body CT images, according to an embodiment of the invention

Another application of a general learning-based framework according to an embodiment of the invention is detection of anatomical landmarks, organs, tissue regions, or anatomical sections in CT, MRI, PET, PET/CT or other types of images. The framework can be used to detect landmarks such as lung corners, liver tips, kidney center, bone intersections, shoulder, bronchi, etc., and to train discriminative classifiers and detectors for organs, tissue regions, or anatomical sections such as kidney, liver, heart, bladder, brain, lung, thorax, abdomen, pelvis, torso, etc. FIG. 4 shows results from a right-kidney-center detection example. The detected kidney center is marked by a white cross. FIG. 5 shows different views of detection results from left and right kidneys in whole-body CT images. In each picture, the 3D bounding boxes of both left and right kidneys are shown.

Hot-Spot Segmentation and Change Quantification in PET, or PET/CT Images

In FDG-PET image analysis, some issues include hot-spot detection, segmentation and identification. A whole-body context understanding method according to an embodiment of the invention using whole-body landmark or organ detection can be used for hot-spot identification. For example, one can first detect organs that often cause high FDG uptake (or "hot-spots") such as kidney, bladder, heart and brain, then hot-spots found near these organs can be understood to possibly relate to physiological uptakes instead of pathological uptakes. The detection of whole-body landmarks can also provide context to the hot-spots, and help the computer to understand where a particular hot-spot is located.

A general and robust framework according to an embodiment of the invention for hot-spot detection, segmentation and change quantification covers the continuum from semi-automatic click-point segmentation and change quantification, to fully automated detection, segmentation and change quantification. Given a PET or PET/CT study with volumes of a same patient at N time points, three clinical use cases for detection, segmentation and change quantification are described. The first case is called "N-click", in which a user clicks on the same hot-spot of interest at each time point. The second case is called "one-click", in which a user clicks on a hot-spot of interest only at time point one, after which an algorithm automatically detects the same hot-spot at all later time points and links them together. The third case is called "automated", which allows fully automated detection of pathological hot-spots, linking the same hot-spot over time, segmentation and change quantification.

A framework according to an embodiment of the invention does not require explicit whole-body registration, although some algorithms proposed in the framework do need local regional registration and correspondences, but they are simpler and more feasible problems to be solved robustly. Statistical and learning methods for automated detection and the classifiers are trained on large sets of labeled data; when the training data changes, the algorithms can adapt naturally. An implemented system according to an embodiment of the invention is fast (real time), robust and accurate, and can be used as a practical application on a regular basis for hot-spot detection, segmentation, and change quantification in PET, or PET/CT images, and other imaging modalities such as PET/MR, PET/CT/MR, SPECT, SPECT/CT, SPECT/CT/MR, etc.

Figure 6:
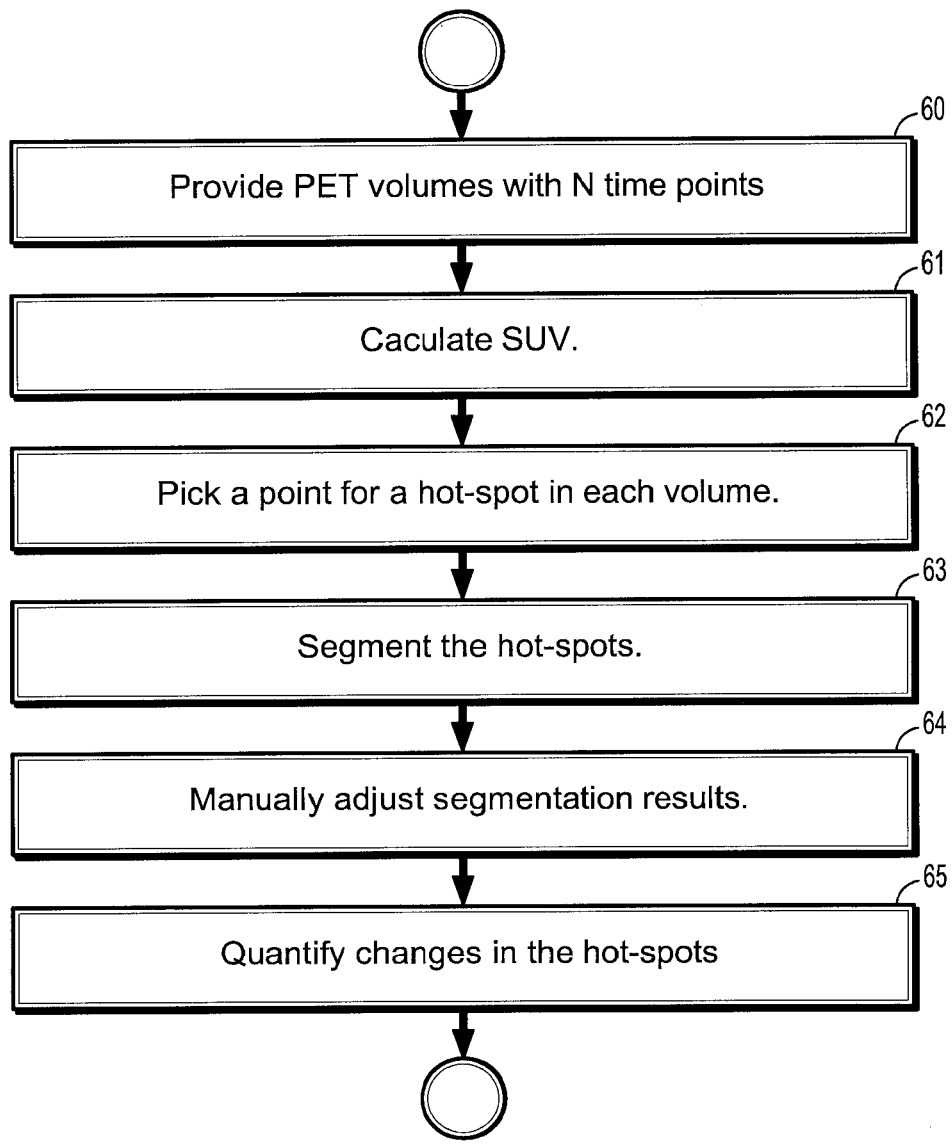
FIG. 6 is a flow chart for detection, segmentation and change quantification method involving N clicks on a hot-spot of interest, according to an embodiment of the invention.

FIG. 6 is a flow chart for a case involving N clicks on a hot-spot of interest, according to an embodiment of the invention. A paradigm for N-click change quantification begins, at step 60, with a PET or PET/CT study with volumes of a single patient at N time points. At step 61 the SUV is calculated for each volume. The SUV, denoted by K, can be calculated as follows:

$$K(SUV) = K(Bq/cm^3) \% (PatientWeight(g)/Dose(Bq)),$$

where $K(Bq/cm^3)$ is the calibrated and scaled pixel value, and Dose(Bq) is the time decay corrected injected dose. Typically, the time delay correction takes the form $\exp(-\log(2)T/\Delta T)$, where T is the interval between the injection time and the scan start time, and $\Delta T$ is the half-life of the radio isotope. Note that, according to other embodiments of the invention, the SUV calculation is optional.

At step 62, a user picks a point for a hot-spot of interest at every time point image volume. This point can be chosen either on an MIP (maximum intensity projection) view, or on a Stripe view of the SUV volumes. Any automated hot-spot segmentation algorithms can be applied at step 63. Exemplary, non-limiting algorithms include region growing with intensity mode seeking, and an anisotropic Gaussian fitting and joint space-intensity likelihood ratio test segmentation algorithm. The region growing algorithm first finds the local maximum SUV value on a hot-spot, then automatically computes the region-growing threshold which is at a certain percentage of the local maximum SUV value. This algorithm is not sensitive to the click point, hence it produces the same result when a user clicks at different points on the same hot-spot. An exemplary mode-seeking region-growing algorithm is described herein below in connection with FIG. 9. At step 64, the user can manually adjust the segmentation results. A user interface is provided to allow the user to change region-growing thresholds or other parameters. Given the new parameters, the segmentation is re-computed. Alternatively, the user can modify the segmented volume of interest (VOI) directly if provided with volume editing tools.

At step 65, a change quantification of one or more properties such as intensity, volume, shape, topology, location, and texture is applied to quantify changes for the hot-spot based on the segmentation results and produce reports. Possible change quantification mechanisms include: (1) Grading of the hot-spot (tumor) at each time point based on the maximum SUV values, and comparing the change in grading over time; (2) Comparing the segmented hot-spot volumes over time, e.g., by quantifying the change in tumor volume size, applying shape similarity/dissimilarity criteria to compare the change in shape, performing volume subtraction, extracting features and comparing feature vectors, etc.; and (3) providing a visualization of the segmented results. VOIs returned from different time points can be rendered as surfaces in different colors, or the segmented volumes can be rendered together with the fused PET/CT image for visual inspection and comparison. Steps 62 to 65 can be repeated for other hot-spots. By performing change quantification on segmentation results, registration of the whole-body volumes over time are not needed. This change quantification scheme relies mainly on accurate segmentation.

Figure 7:
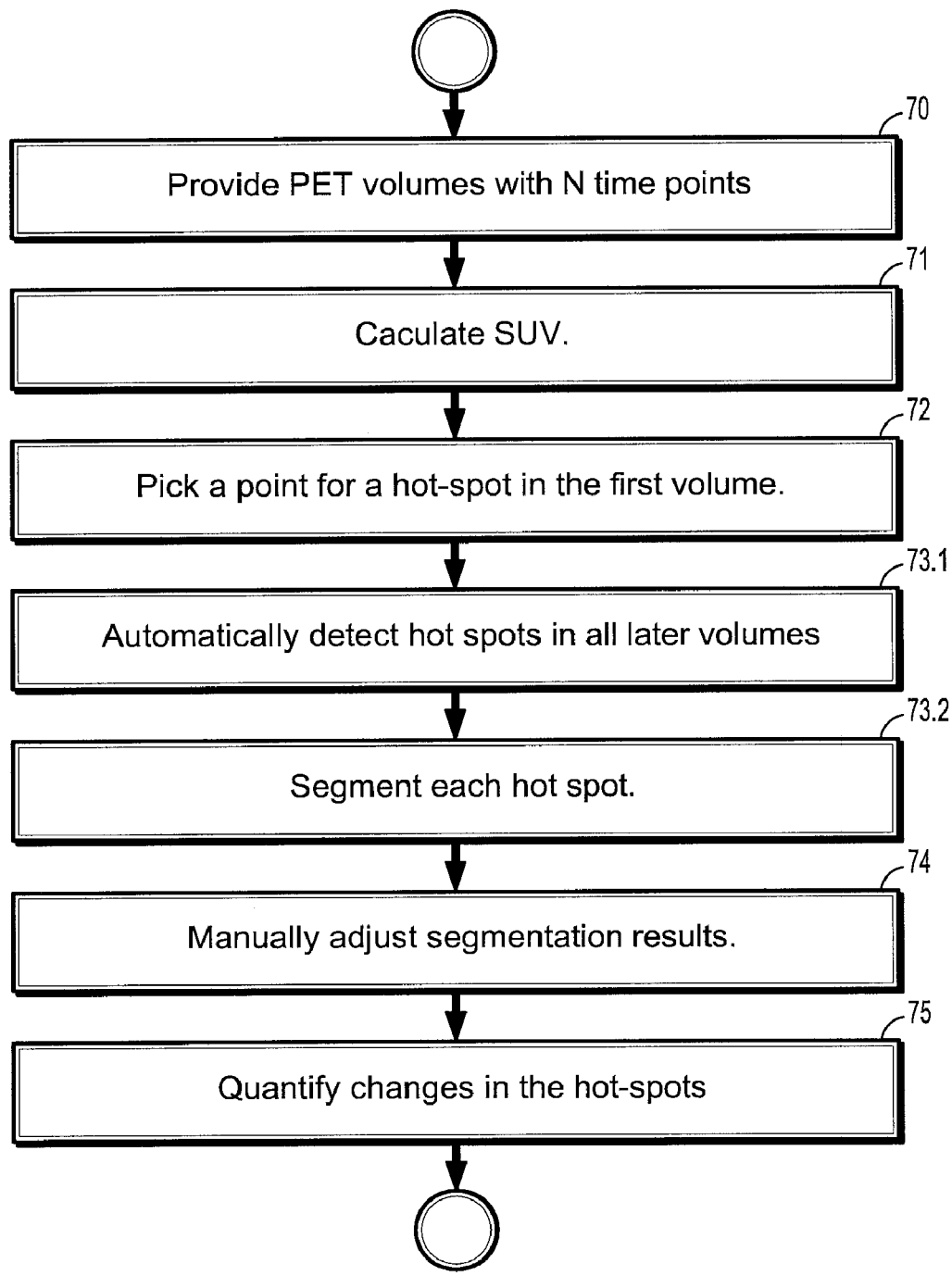
FIG. 7 is a flow chart for detection, segmentation and change quantification involving only one click, according to an embodiment of the invention.

FIG. 7 is a flow chart for a case involving only one click to achieve change quantification over time, according to an embodiment of the invention. Steps 70, 71, 74, and 75 correspond to steps 60, 61, 64, and 65 of FIG. 6. The one-click system differs from the N-click system in the following aspects. At step 72, a point is selected for a hot-spot of interest at the first time point, instead of at every time point. This reduces the number of clicking points from N to one.

At step 73.1, an algorithm for automatically detecting the same hot-spot at all later time points and linking them with the hot-spot at time volume 1 is applied. An exemplary, non-limiting algorithm is as follows. For time volume 1, extract a sub-volume containing the hot-spot that was selected. The size (or scale) of the subvolume is determined using information-theoretic criteria to ensure that there are enough structures or discriminative features inside the subvolume. For a combined PET/CT image, the subvolumes are extracted from both the PET and the CT images. At each time between 2 to N, a plurality of subvolumes containing hot-spots are extracted. The hot-spots can be detected by thresholding, and the subvolumes of proper scales are extracted. In PET/CT images, subvolumes from both PET and CT images are extracted. The subvolume containing each hot-spot is compared with the hot-spot subvolume from time 1, and the likelihood that this hot-spot corresponds to the clicked hot-spot at time 1 is computed. The maximum likelihood hot-spot at this time is returned as the corresponding hot-spot to the one clicked at time 1. At step 73.2, a segmentation algorithm is applied to find the boundary of the hot-spots at all time points. The remainder of the system is similar to that for N-click, depicted in FIG. 6.

Thus, given a hot-spot clicked at time 1, the same hot-spot is automatically detected at times 2 to N. Segmentation and change quantification follows subsequently. In addition, deformable registration can be used on subvolumes or subsections of the body to find corresponding hot-spots and perform change quantification.

One issue is how to deal with hot-spot changes and even disappearance over time because of therapy response. One possibility is to rely more heavily on CT rather than on PET when searching for correspondences since changes on CT are expected to be less significant.

Figure 8:
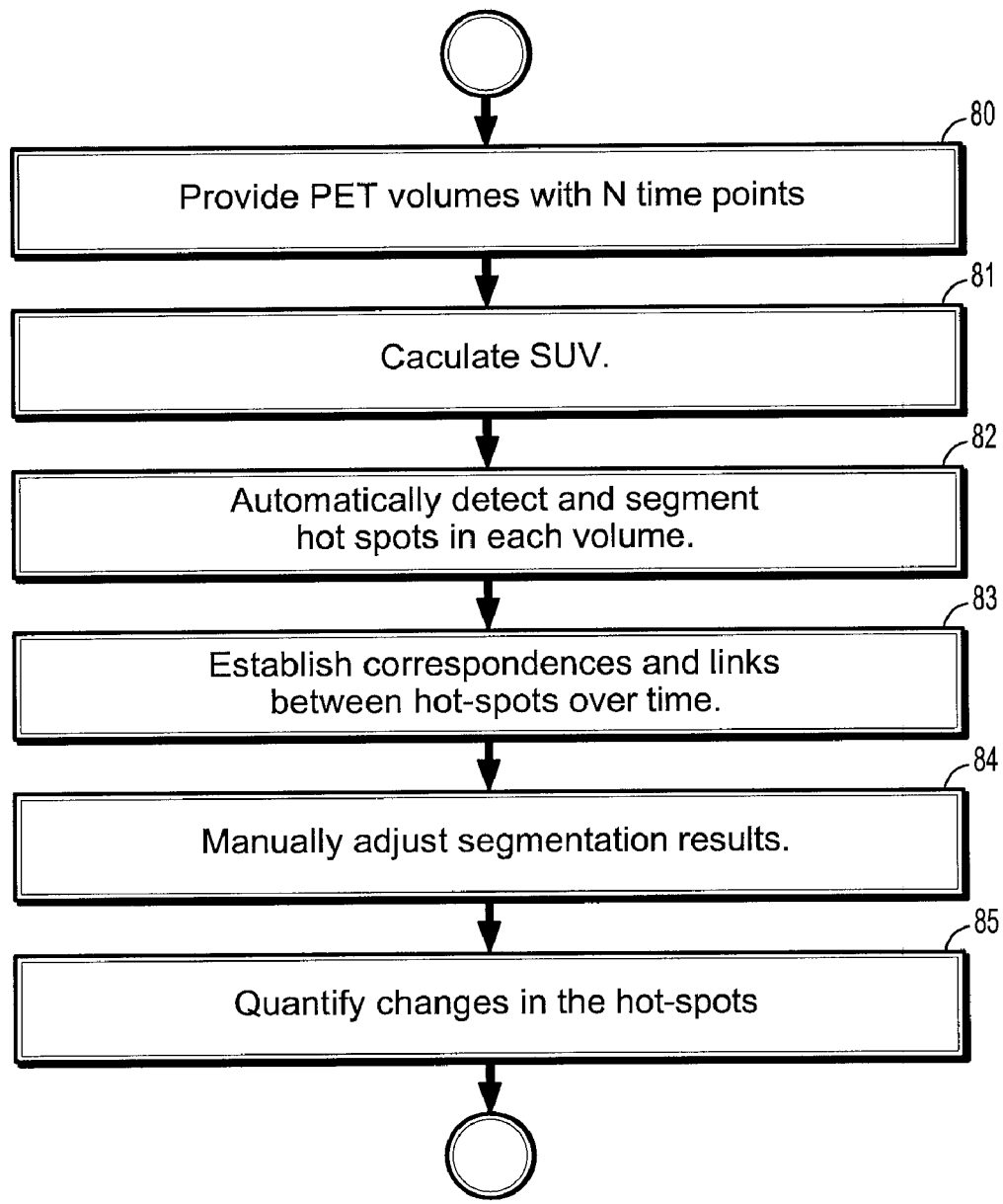
FIG. 8 is a flow chart for detection, segmentation and change quantification with a fully automated hot-spot detection, according to an embodiment of the invention.

FIG. 8 is a flow chart for a case involving a fully automated to achieve hot-spot detection, segmentation, and change quantification, according to an embodiment of the invention. Steps 80, 81, 84, and 85 correspond to steps 60, 61, 64, and 65 of FIG. 6. This system differs from the N-click and one-click systems in that it does not require any click point, and interesting hot-spots (e.g. hot-spots that correspond to tumor locations) are detected automatically at all time points. The fully automated system includes two algorithmic components on top of the segmentation algorithms for N-click and one-click.

Figure 11:
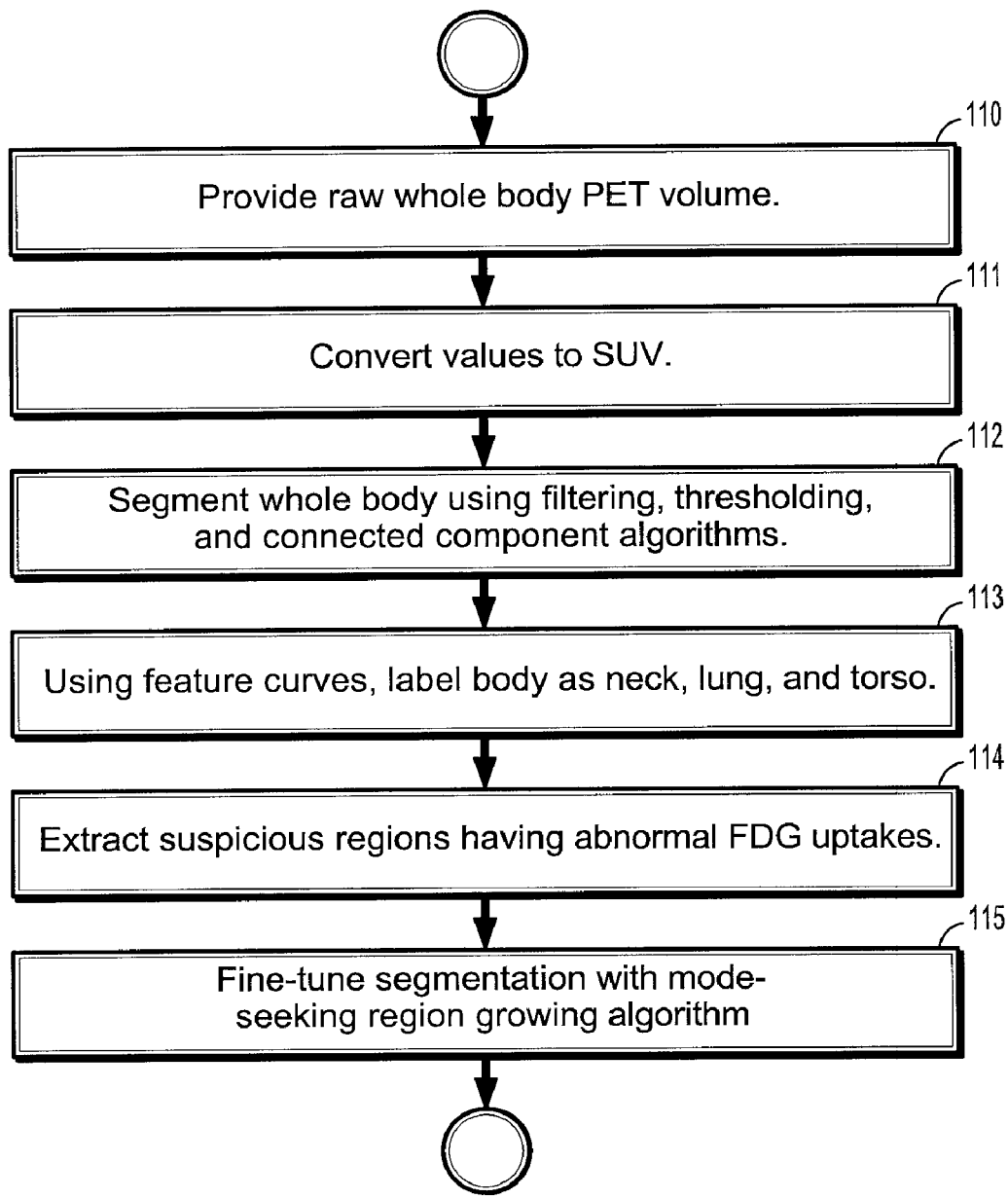
FIG. 11 is a flowchart of an adaptive labeling and segmentation PET-CAD system according to an embodiment of the invention.

At step 82, a first component performs automated hot-spot detection and segmentation. While it is not very challenging to detect all hot-spots in a PET volume based on SUV values, it is challenging to differentiate between hot-spots that correspond to abnormality and hot-spots that correspond to normal physiology. Brain, heart, kidney, bladder are among those that usually induce high FDG uptake in normal physiology, while liver, bone marrow, spleen, bowel sometimes also have mildly high FDG uptake. Intrinsic PET imaging pitfalls and artifacts further complicate matters. According to an embodiment of the invention, an automated detection framework described herein below in connection with FIG. 11 is based on statistical landmark appearance learning, landmark detection, hot-spot localization (i.e. find organ context for each hot-spot), and statistical analysis to classify each hot-spot being abnormal or normal.

At step 83, a second component establishes correspondences and links between hot-spots over time. This aids in change detection and quantification. If automated hot-spot detection is performed separately at each time point, then this step establishes correspondences between the detected hot-spots across time. If the automated hot-spot detection is done only for the first time point, then the linking algorithm from a one-click system can be used to find those hot-spots in all later time points Mode-Seeking Region Growing with Application to Hot-Spot Segmentation An exemplary mode-seeking region-growing (MSRG) algorithm, with application to click-point segmentation of hot-spots in PET images, such as one that can be used in step 63 of FIG. 6, first seeks a voxel with the local maximum intensity value, then initiates a region growing process with that voxel as the seed point, with the threshold set at a percentage of the local maximum intensity value. Note that this intensity can be a SUV. A region growing algorithm according to an embodiment of the invention produces accurate, reproducible results that are insensitive to the click point. The local maximum intensity criterion and the threshold setting are clinically meaningful. Both the mode-seeking procedure (looking for the voxel with maximum intensity value) and the region growing procedure have simple and efficient recursive implementations.

In a traditional region growing algorithm, the click point is treated as a seed point, and a region grows from this seed point by adding more and more adjacently connected voxels as long as the newly added voxels' intensities are sufficiently close to the initial seed point's intensity (e.g. difference less than a threshold). There are several limitations in these region growing algorithm when applied to hot-spot segmentation in PET however.

First, these algorithms do not take into account clinically useful information about PET imaging, hence the region growing and threshold selection processes are not clinically meaningful. Hot-spots in PET do not have well-defined edges because of the large voxel sizes and gradual intensity change; and most tumor hot-spots are inhomogeneous hot-spots with inhomogeneous interior intensities. In addition, although malignant tumors tend to have much higher SUV values than benign ones, the SUV variation among malignant neoplasms is large and could range from slightly greater than 2 to as high as 20. SUV values also vary between different classes of neoplasms; non-small lung cancer has relatively high FDG uptake at 1 hour after injection, with an average SUV of 8.2, whereas breast cancer has an average of 3.2; liver cancer often has an SUV above 8 so that they stand out from surrounding normal liver tissue (with SUV value around 2.5). In summary, these variations present a challenge for a traditional region growing algorithm to determine a proper threshold, without using clinical information.

Second, a traditional region growing algorithm is sensitive to the clicking point. That is, if an operator clicks, or different operators click, at different locations on a same hot-spot, the region growing algorithm would return different segmentation results because the intensity (i.e. SUV value) at those click points differ and in turn the thresholds used for stopping region growing differ. This is un-desirable because the segmentation results should be stable and reproducible.

Figure 9:
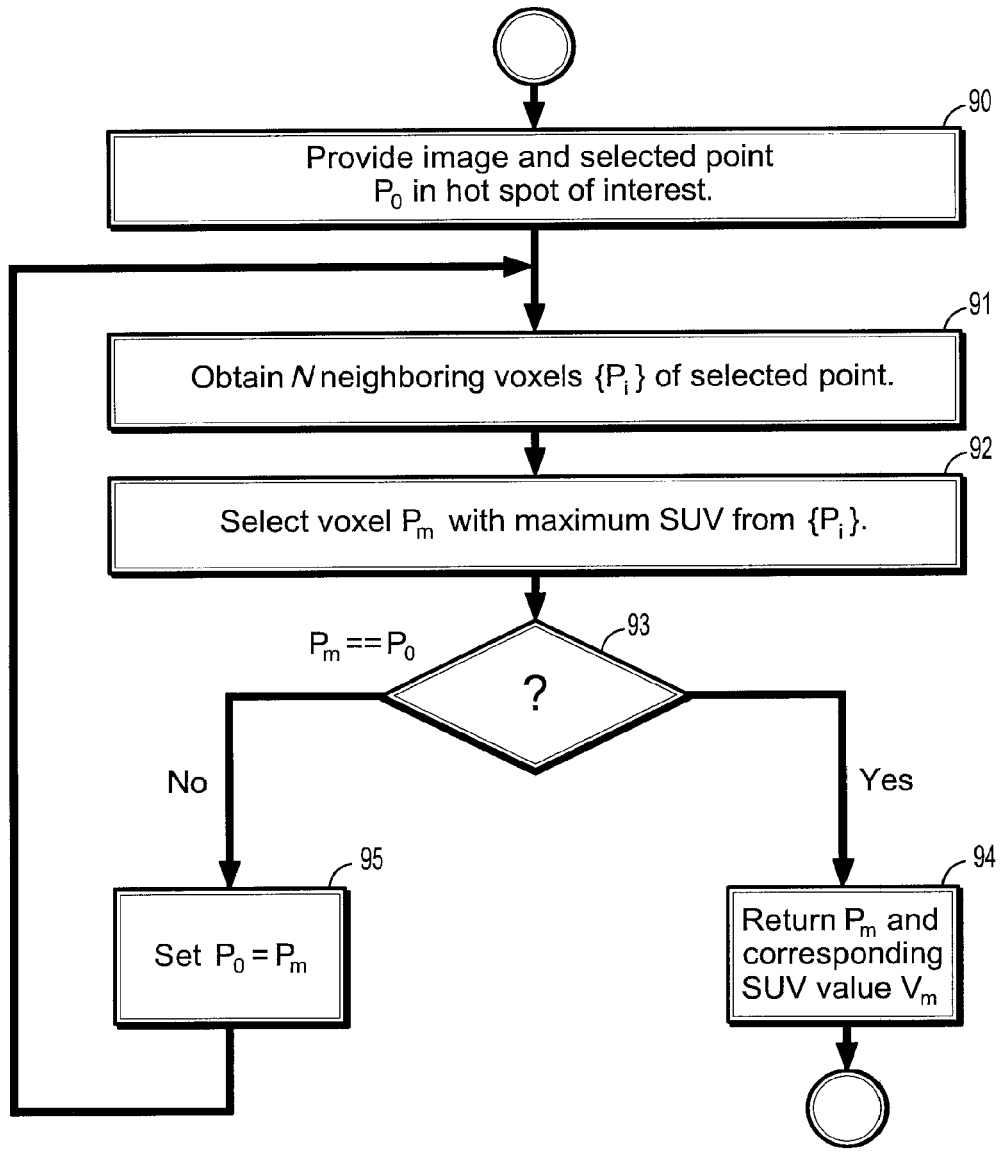
FIG. 9 is a flowchart of a mode-seeking algorithm according to an embodiment of the invention.

A mode-seeking region-growing algorithm adapted to PET hot-spot segmentation includes two components, a mode-seeking component and a region-growing component. A flowchart of a mode-seeking algorithm according to an embodiment of the invention that finds a voxel connected to the click-point with the local maximum intensity value is depicted in FIG. 9. Referring to the figure, the algorithm begins at step 90 by providing a 3D PET volume I and a click point on the hot-spot of interest, $P_0$. At step 91, N neighboring voxels of $P_0$ are obtained in 3D. Let this set of voxels be denoted $\{P_i\} = P_1, P_2, \ldots P_N$. Depending on the choice of 3D connectivity, N can be 6, 18, or 26. At step 92, the voxel with a maximum intensity value is selected from $\{P_i\}$. This voxel is denoted by $P_m$, and its maximum intensity value is denoted $V_m$. Then, at step 93, if $P_0 = P_m$, the algorithm returns $P_m$ and $V_m$ at step 94 and terminates. Otherwise, the algorithm sets $P_0 = P_m$ at step 95, returns to step 91 and repeats steps 91 to 93. The output is the voxel that has the local maximum intensity value on the hot-spot, $P_m$, and the corresponding local maximum intensity value, $V_m$. Again, note that according to an embodiment of the invention, the intensity value can be the SUV.

A mode seeking algorithm according to an embodiment of the invention is a simple, efficient implementation for a discretized version of the general mode-seeking algorithm. In the general formulation, the volumetric PET image is treated as a discretization of a 3D continuous, non-negative signal $f(x)$ over a 3D regular lattice. Then the voxel with the local maximum intensity value corresponds to the lattice location where a mode in the function $f(x)$ is found. The mode-seeking process is to start from some lattice location (e.g. the click point), then find the nearest "stable" mode in the signal $f(x)$. If the image is viewed as a 4D surface $f(x; y; z)$ where $(x; y; z)$ covers the 3D image domain, then the path of the probe is a path moving uphill in the function field $f(x; y; z)$ to the nearest mode. This mode seeking procedure is a more straightforward version of meanshift.

In the embodiment of the algorithm presented in FIG. 9, the bandwidth, or scale, was assumed to be one when collecting neighboring voxels $P_1, P_2, \ldots P_N$. That is, neighboring voxels are collected in a 3%3%3 window centered at $P_0$. According to other embodiments of the invention, this scale can be made larger, and neighboring voxels can be those in a 5%5%5, 7%7%7 or even larger window sizes. On one hand, the larger the window size is, the more stable (or global) the found mode is; on the other hand, if two modes that correspond to two separate hot-spots are close to each other, a large window size may cause the two hot-spots be merged into one.

Figure 10:
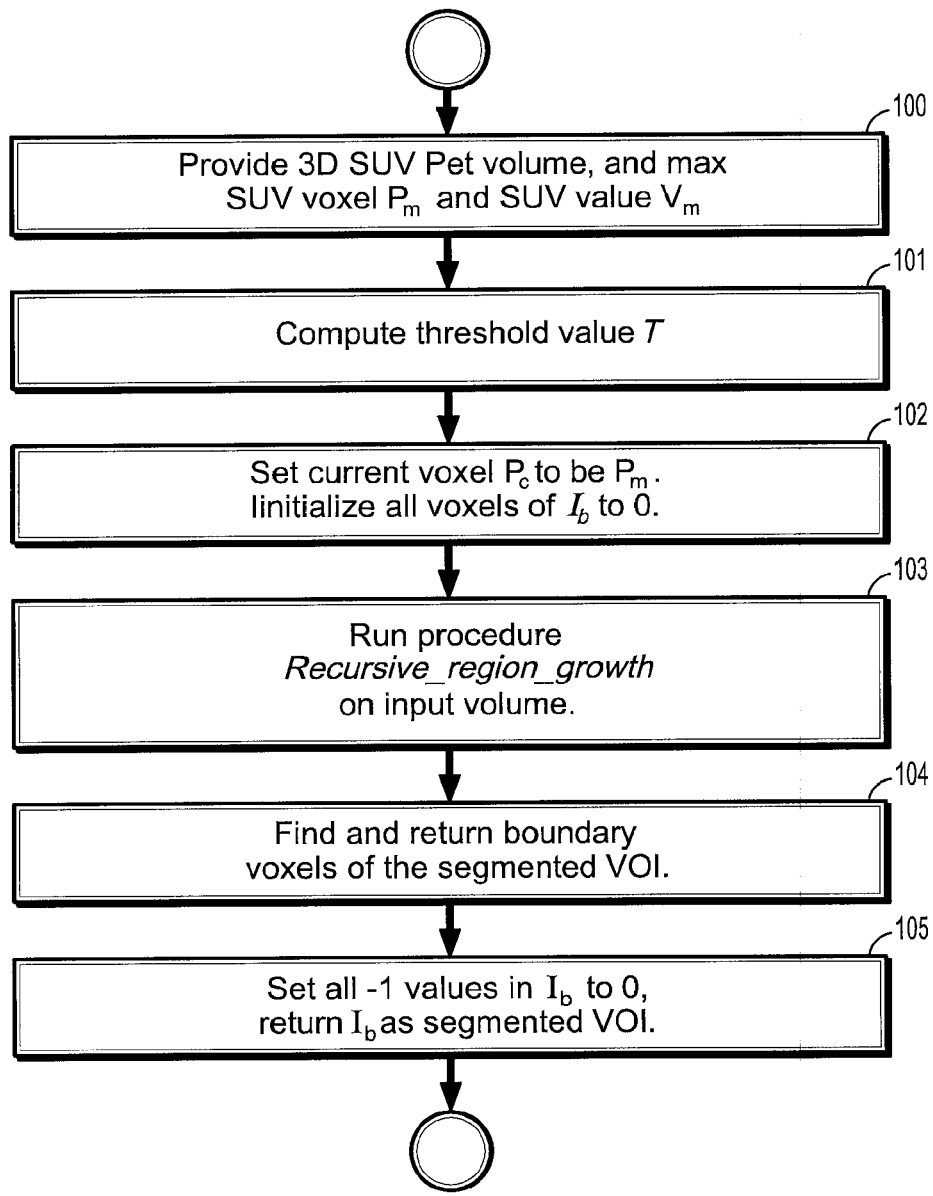
FIG. 10 is a flowchart of a region-growing algorithm according to an embodiment of the invention.

A flowchart of a region-growing algorithm according to an embodiment of the invention the segments the hot-spot is depicted in FIG. 10. For region growing, the seed point is the voxel with local maximum intensity, $P_m$, returned from the mode-seeking algorithm according to an embodiment of the invention. The threshold for stopping the region growing process is, k% $V_m$, where $V_m$ is the maximum intensity value returned from mode-seeking, and k is a percentage value. The region continues to grow as long as the newly added voxels have intensity values above the threshold. A commonly used percentage value is k=40%. A region-growing algorithm according to an embodiment of the invention returns a 3D binary volume, $I_b$, which has value 1 inside the segmented hot-spot VOI, and 0 elsewhere, and boundary voxels $\{x_1, \ldots, x_n\}$ of the VOI.

Referring now to the figure, a region growing process according to an embodiment of the invention begins at step 100 by providing the 3D PET volume, I, and the outputs from the mode-seeking algorithm, including the voxel with local maximum intensity value on the hot-spot, $P_m$, and its local maximum intensity value, $V_m$. At step 101, a threshold value T=k % $V_m$ is computed. According to an embodiment of the invention, k=0.40. At step 102, the voxel under current consideration is set to be $P_c=P_m$, and $I_b$ is initialized by setting the value of all its voxels to be 0. At step 103, a recursive procedure is performed on the input volume I. This recursive procedure, starting with point $P_c$, selects and adds neighboring points to the segmented sub-volume whose intensity is greater than the threshold value. As neighboring points are visited and either selected or rejected, each point is marked in the corresponding segmentation mask with a '1' to indicate that it is part of the segmented sub-volume, or a '−1' to indicate that it is not. An exemplary, non-limiting procedure can be described by the following pseudo-code.

```
Recursive_region_grow(I, I_b, P_c, T)
    If I_b(P_c)==1 or I_b(P_c)==-1 Then Return
    // P_c has already been processed
    Else V_c = I(P_c).
        If V_c < T Then
            //label P_c as already processed, but not part    // of the
hot-spot
            I_b(P_c)=-1
            Return
        Else if V_c >= T Then
            // label P_c as already processed, and part of the    //
hot-spot
            I_b(P_c)=1
            // Then recursively call the procedure for all    //
neighboring voxels {P_1, P_2, ... P_N} of P_c in 3D    // before returning.
            For i=1 to N do
                Recursive_region_grow(I, I_b, P_i, T)
            End
            Return
        End
    End
End
```

Note that, for a 3%3%3 window centered at $P_c$, depending on the choice of 3D connectivity, N can be 6, 18, or 26.

Those voxels that have value 1 in $I_b$, but are adjacent to a voxel with the value −1 in $I_b$ are located at step 104 and returned as the boundary voxels of the segmented VOI, $\{x_1, \ldots, x_n\}$. Then, at step 105, all −1 values in $I_b$ are set to be 0, and $I_b$ is returned as the binary volume representing the segmented VOI. A manual adjustment of the segmentation result can be performed if necessary, either by manually changing the region growing threshold T and/or the percentage k, then re-run region growing, or by editing the segmented VOI directly using 3D editing tools.

A mode-seeking region-growing algorithm according to an embodiment of the invention delivers clinically meaningful results. Radiologists and nuclear medicine physicians have long used the maximum SUV value for tumor grading (e.g. malignant/benign), and 40% of local maximum is a popular threshold value used in quantitative measurement of tumor volume. A one-click segmentation algorithm according to an embodiment of the invention is not sensitive to the clicking point. The segmentation result is the same and reproducible when different operators click at different locations on a hot-spot, or the same operator clicks at different times. A mode-seeking region-growing algorithm according to an embodiment of the invention can be used for PET/SPECT or fMRI hot-spot segmentation. Results can be used for staging disease, tumor grading, robust tumor volume quantification, among other applications.

A mode-seeking region-growing algorithm according to an embodiment of the invention is not limited to the embodiment described above. In the mode-seeking component, the bandwidth, or scale, can be increased, such that neighboring voxels can be collected in a 3%3%3, 5%5%5, 7%7%7 or even larger window sizes. Local smoothing can also be applied prior to mode-seeking. Variations of the mode-seeking component include mean shift and many variations of mean shift. For both mode-seeking and region growing, non-recursive implementations exist, as is well known in the art. For region growing, the threshold percentage value can be any other percentage value instead of 40%.

Normal vs. Pathological Hot-Spot Interpretation in PET/CT Images

PET/CT imaging allows the fusion of functional and structural information on a common platform for better diagnosis and quantification of pathological changes. The objects of interest in PET/CT images are the PET hot-spots, which can correspond to either tissues with high glucose metabolism rate or high glucose (blood sugar) content. Since both normal physiology, such as heart, kidney, or bladder, and pathology, such as tumor or inflammations, produce hot-spots, one issue in the application of CAD applied to tumor detection is to separate normal hot-spots from pathological hot-spots, an issue that requires the understanding of whole-body context.

A learning-based method according to an embodiment of the invention for whole-body context interpretation can be used to provide this understanding, because it enables the computer to understand on which organs or tissue regions each hot-spot is located, hence making it possible to separate normal hot-spots from pathological ones. The basic idea is to first detect normal physiological organs or regions that often induce high FDG uptake, such as the heart, kidney bladder, and brain. Then for each such organ/region, the detection result can be used to initialize a seed point so that a hot-spot segmentation method according to an embodiment of the invention can be used to segment the hot-spot on or near that organ or region. Then a segmented hot-spot which is considered a hot-spot due to normal physiological uptake is suppressed or compensated for. At the end of the process, all normal hot-spots are suppressed and have their hot-spot high-uptake values replaced with background low-uptake values, hence only pathological or abnormal hot-spots remain as bright spots in the PET or PET/CT image.

Adaptive Criteria for Body Section Labeling and Segmentation

As described above, a first step to automatic interpretation of whole-body structure and function is to know the anatomical context. A system according to an embodiment of the invention exploits knowledge from the clinical literature and addresses three issues: body context interpretation, detection of volumes with high FDG uptake, and accurate segmentation of hot-spots. According to an embodiment of the invention, the body is roughly labeled into three sections: head, lung and bottom sections. An initial rough labeling of the body allows adaptive adjustment to each body section. Detecting a volume with high FDG uptakes provides the candidate volume (volume of interest or VOI) that serve as input to the segmentation algorithm. The results of the segmentation algorithm are CAD hot-spot findings that can be presented to the radiologist in both 2D and 3D views.

A flowchart of a PET-CAD system according to an embodiment of the invention is depicted in FIG. 11. Referring now to the figure, given a raw PET volume at step 110, the PET values are optionally converted at step 111 to Standardized Uptake Values (SUV). Since FDG intakes of different organs are different, for accurate detection and segmentation, it is essential to understand the body context.

At step 112 the whole body is segmented using median filter, thresholding and connected component algorithms. First, noise is removed by a median filter. Then, using an SUV threshold of 0.1, the connected components containing the median point are found. During the body segmentation process, the centroid and mean intensity of the body is calculated for each axial slice, which are represented as two feature curves in 3D space. These 3D curves are robust to noise and can serve as a good references for body part localization.

At step 113, using the feature curves, the body is labeled into anatomical regions, such as the neck (above lung), lung, and torso (below lung). Note that these anatomical regions are exemplary, and the body could be labeled according to other anatomical region categories. The technique employs a spatial Hidden-Markov Model (HMM) to derive a rough body context interpretation. Malignant cells in different organs exhibit different levels of FDG uptake. Thus, to accurately detect abnormal FDG uptake in a PET volume, one desires to have a rough anatomical interpretation of the volume. By providing rough labeling, a more accurate and efficient analysis algorithm can be designed. However, it is challenging to extract anatomical information from a PET volume, as the PET data does not present detailed structures of the body.

Figure 12:
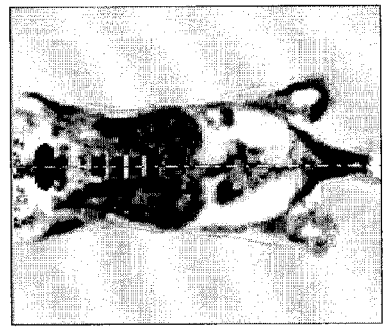
FIG. 12 illustrates the difference in FDG uptake between the lungs and the abdomen, according to an embodiment of the invention

A body section labeling algorithm according to an embodiment of the invention can be based on two observations. First, the neck curve when the 3D medial axis of the body is projected to the sagittal plane exhibits a distinctive pattern. Second, the FDG uptake of the normal tissue of the lung is generally less than other tissues such as liver and kidney. FIG. 12 illustrates the difference in FDG uptake between the lungs and the abdomen. A 3D body can be compressed into characteristic feature curves that preserve the above observations. An exemplary, non-limiting feature curve of the first observation is a trace of the centroid of the body in each axial slice. An exemplary, non-limiting feature curve of the second observation is, after removing SUVs above 2.5, a trace of the mean intensity in each axial slices.

According to an embodiment of the invention, a Hidden Markov Model(HMM) is used to divide the body into three sections: neck, lung and abdomen. HMM is a powerful parametric model and can characterize the stochastic processes, namely the measurable observation process and the immeasurable hidden states. A spatial discrete HMM is considered along a head-to-toes direction. Anatomical models, such as a neck model and a lung model, are obtained from the observation patterns of anatomical regions, such as the necks and lungs. Training samples for the two feature curves are extracted by manually marking the neck and lungs. After vector quantization, for the given training samples, the models are obtained by maximizing the likelihood Pr(Observ|Model).

In a recognition stage, using the models and a newly provided image, the locations of a neck and lungs are obtained by searching for the best match point in the whole body feature curves to the models. To do so, the Pr(Model|Observ) is computed within a window sliding along the ordinate axis of the curves with the forward-backward algorithm to locate the maximum point. In a system according to an embodiment of the invention, the probability curve is post-processed with the spatial integration, and the location of the maximum likelihood point is output as the final neck or lung point.

Figure 13:
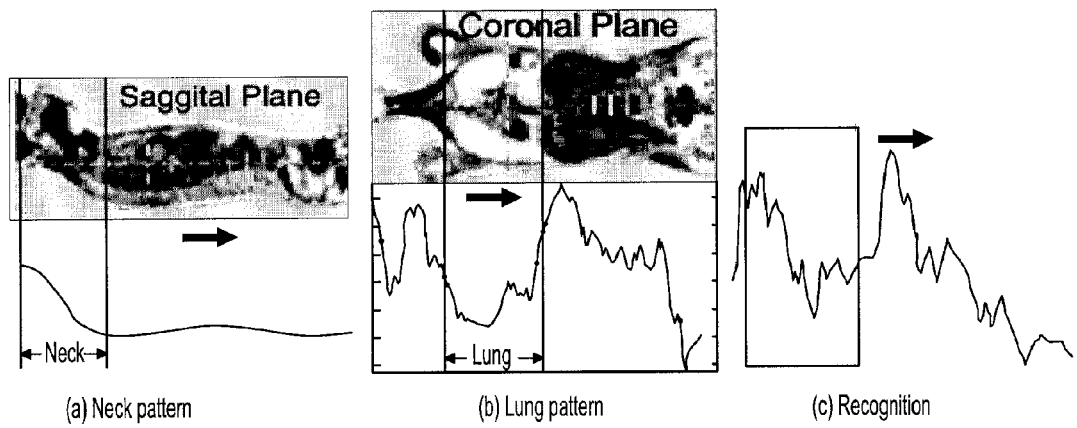
FIGS. 13(a)-(c) illustrate the observations and recognition of an HMM process according to an embodiment of the invention.

FIGS. 13(a)-(c) illustrate the observations and recognition of an HMM process according to an embodiment of the invention. FIG. 13(a) depicts a neck curve when the 3D medial axis of the body is projected to the sagittal plane on top of its associated feature curve. FIG. 13(b) illustrates how the FDG uptake of the normal tissue of the lung is generally less than other tissues, on top of its associated feature curve. FIG. 13(c) illustrates the recognition process for the lung feature. The black arrows in each figure indicate the mean intensity trace after removing SUVs above 2.5.

Referring again to FIG. 11, at step 114, suspicious regions with abnormal FDG intakes are extracted. A competition-diffusion (CD) algorithm can be used for this task. The CD is sensitive to initialization, and the body section information obtained in step 92 is used to introduce different initialization strategies to lung and other organs.

Figure 14:
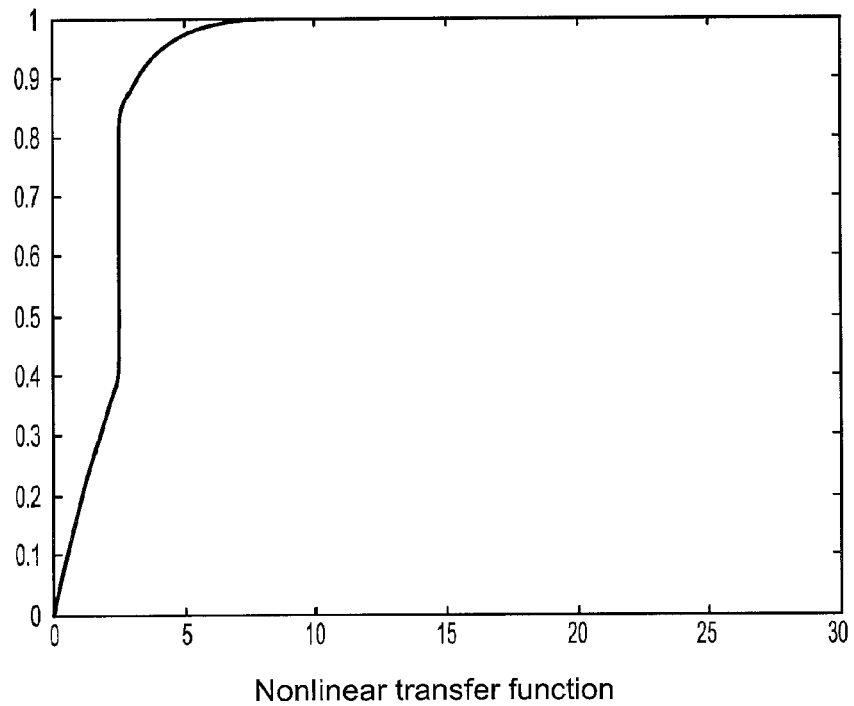
FIG. 14 is a graph of a non-linear transfer function for transforming the SUV to a normalized value, according to an embodiment of the invention

According to an embodiment of the invention, the SUV is transformed to a normalized value with a non-linear transfer function, depicted in FIG. 14, based on a watershed threshold of 2.5, before application of the CD procedure. The transfer function is based on two exponential functions, and has a benefit in that there is no need to set the thresholds (for example, which threshold corresponds to probability 1) during the conversion. Referring to the figure, a first part of the transfer function curve 141 on the domain x=[0, . . . , 2.5] is based on the first of the two exponential functions, and has form y=exp(a×x)−1. A second part of the transfer function curve 142 is a vertical line for x=2.5. A third part of the transfer function curve 143 is based on the second exponential of the form y=1−exp(−b×x). The values of a and b are chosen so that the transfer function is continuous and has the proper limiting values for large x and as x→0.

Competition-diffusion, also referred to as reaction-diffusion, is a segmentation algorithm which assigns to each voxel a class label from a set of n classes. It includes two processes: competition and diffusion. The competition process selects the most fitted label and prevents over smoothing. The diffusion process brings a good spatial coherence to the detection map. The class label for each voxel is determined from a probability state vector $\vec{x} \in S^n$, where $S^n = \{ \vec{x} \mid x_i \geq 0, \Sigma_i x_i = 1 \}$. Each component in the state vector gives a normalized fitness of the particular class. The closer the component value is to 1, the more fitting the location is to the class. In a system according to an embodiment of the invention, n=2, and $x_1$ and $x_2$ are state values for the voxel being normal and suspicious tissues, respectively.

An initialization step translates the observed voxel SUV value to state values $x_1$ and $x_2$. For lungs, SUVs higher than 2.0 are considered abnormal, while for liver and kidney, SUVs higher than 3.0 are considered abnormal. From the body context interpretation step, it is known roughly where the lungs are, and this knowledge is used to employ different initialization strategies for lungs and other organs. Exemplary values include $x_2(v_{SUV}) = \min(1, v_{SUV}/3.8)$ for the lung section, where $v_{SUV}$ is the SUV value for a particular voxel, and $x_2(v_{SUV}) = \min(1, v_{SUV}/5)$ for other sections to derive the initial value of $x_2$. Throughout, $x_1$ is initialized to $1 - x_2$.

After the initialization, $x_i$ at each voxel obeys the following dynamics:

$$\dot{x}_i = x_i(f_i - \bar{f}) + \mu \nabla^2 x_i,$$

where $\dot{x}_i$ is the time derivative of $x_i$, $f_i$ is the fitness measure associated with $x_i$, $$\bar{f} = \sum_i x_i f_i$$

is the average fitness, $\mu$ is a constant, and $\nabla^2$ is a linear diffusion operator. When the $f_i$'s are linear, symmetric and positive definite, the system converges to a state where each voxel has one dominant state. According to an embodiment of the invention, an identity mapping $f_i = x_i$, $\forall i$, is used. The label corresponding to the dominant state is assigned to generate a segmentation map. The CD algorithm with a low cut-off threshold produces VOIs that have high probabilities of being hot-spots. Because this is a conservative criteria to detect a VOI, the volumes tend to be larger than the true extent of the hot-spots, and several nearby hot-spots may be merged in one volume.

Finally, referring once again to FIG. 11, at step 115, according to the body context knowledge and detection results, in order to achieve accurate quantitative volume measurement of each hot-spot, the segmentation is fine-tuned by a mode-seeking region growing algorithm, such as that described above in connection with FIGS. 9 and 10. By starting the mode-seeking procedure from many seed points uniformly distributed within a VOI, one can detect all the SUV-maxima points that correspond to the primary locations of true hot-spots. The region growing process applies 3D region growing with seed points at the detected SUV-maxima points. The mode-seeking region growing algorithm is applied to all the VOI detected by CD.

Organ/Region-Specific Thresholding for Automatic Generation of Hot-Spot Candidates In PET images, because FDG uptakes by different organs or tissues have large variations, a global thresholding on the converted SUV volumes often fails to provide good hot-spot candidates. For example, tumors in the lung may have lower SUV values than normal tissue in the liver. Hence to automatically generate good hot-spot candidates, organ-specific or region-specific thresholding is very attractive. Using a whole-body context according to an embodiment of the invention, one can first detect, segment and separate organs or regions that have different ranges in SUV values, then apply organ- or region-specific thresholding. For instance, one can first detect and segment the lung, the liver, and other organs, or detect and separate the thorax and abdomen regions. Then a threshold is chosen for the lung, such as the mean SUV value in the lung region, and hot-spot candidates can be generated in the lung which have SUV values above the threshold. A different threshold can be chosen for the liver, such as the mean SUV value in the liver, and hot-spot candidates can be generated in the liver.

Adaptive Threshold Selection and Segmentation of Hot-Spots

While tumor size is an important prognosis factor, for both manual and automatic tumor delineation and segmentation, accuracy and variability is an issue. According to an embodiment of the invention, an automatic method for determining intensity threshold for 'hot-spot' segmentation in PET images can reduce the delineation variability as well as providing an automatic tool of adaptive threshold selection based on training on a set of expert delineated contours.

Figure 15:
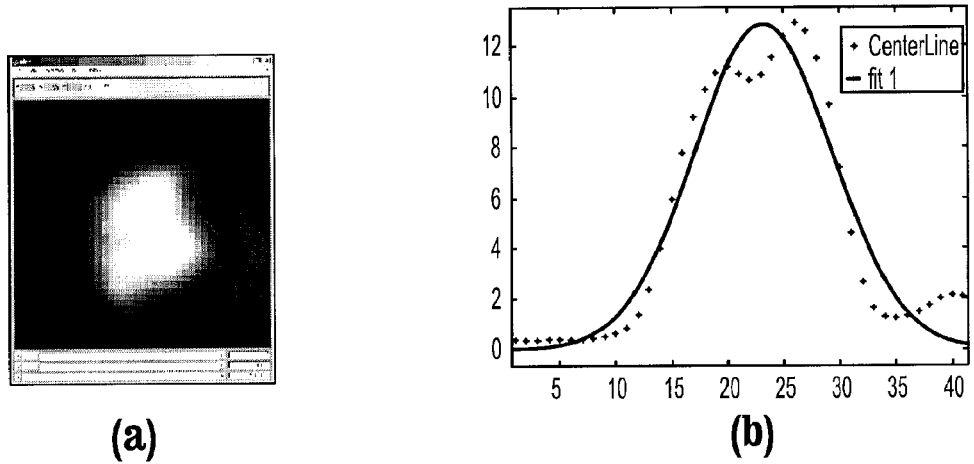
FIGS. 15(a)-(b) shows an example of 1D Gaussian fitting to the intensity distribution on a linear cross-section of the tumor image, according to an embodiment of the invention

A first step of an adaptive threshold selection method according to an embodiment of the invention is to acquire a training data set of expert contour delineation of multiple two or three dimensional tumor images. The data set could contain contours drawn by one or several experts. In case of several expert's contours, the average or median contour could be derived, or a probability could be assigned for each image voxel being inside the tumor boundaries. The 3D training images, slices or linear cross-sections are then fit to 1D, 2D, or 3D Gaussian. FIG. 15(b) shows an example of 1D Gaussian fitting to the intensity distribution on a linear cross-section of the tumor image from FIG. 15(a). The Gaussian model is given by the equation:

$$y = a \times \exp\left(-\frac{(x-b)^2}{c^2}\right)$$

where a is the amplitude, b is the centroid location, c is related to the peak width. For each Gaussian fitting of 3D training images, slices or linear cross-sections, the expert delineated boundary position is mapped to the Gaussian and the following distance is determined:

$$d = K \% c$$

where d is defined as a distance from the center of Gaussian to the boundary position. The average or weighted average of K across all training images, slices or linear cross-section is determined.

For every new (test) image, the Gaussian fitting is performed and the intensity threshold is determined as a value of the Gaussian:

$$T = y(b - Kc),$$

where K is determined by training process described above. Different scales of Gaussians can be fitted to the test images by extraction of a sub-volume or a region of interest of different sizes. A best size of sub-volume or a region of interest for Gaussian fitting could be determined by selecting a sub-volume that contains bright and dark voxels within certain percentage limits. A center for a sub-volume or a region of interest could be determined either automatically or interactively by a user.

Abnormality Detection Using a Probability Map of Normal Bright Spots

As described above, distinguishing tumors from normal tissue in PET images is complicated because normal organ and tissue might appear as having the same intensity as tumors in a PET image. According to an embodiment of the invention, a probability map of normal bright spots is used to distinguish tumors from normal tissue and organs. A model image and a probability map of voxel brightness can be created using a set of aligned training images of normal patients or larger number of images obtained from both sick and normal patients. A 3D or a 2D probability map can be calculated. The 2D probability map is calculated based on maximum or average intensity projections on coronal plane.

Training images of normal patients can be aligned by different methods. One method according to an embodiment of the invention, uses manually or automatically placed landmarks or reference points in characteristic places, such as organ locations, such as the heart, bladder, lung corners, body contour points, etc. Another alignment method according to an embodiment of the invention is to apply image registration methods to grayscale images or to images of body and organ contours.

The model image and probability map thus created are then used in the detection of hot-spots in new or test images. Different models and probability maps can be created for female and male patients.

It is not necessary to fully align a new image to the model image. Instead, only the bright spots need be registered to a probability map. First, local maximums or bright spot locations for new patients are determined. An optimization algorithm is then used to align the centers of the bright spots in a new patient to the probability map. This can be performed either using 3D images or 2D maximum or average intensity projections on the coronal plane.

The centers of those bright spots which do not map to any of the normal bright spot in the probability map, are treated as hot-spot candidates. Hot-spot candidates are then marked or highlighted for viewing by a physician or are passed to a classification procedure along with additional features such as texture, average intensity, size, volume, moments of intensity, curvature, etc., calculated in and around the hot-spot candidates. The probability of voxels belonging to an abnormal site or a hot-spot can be derived directly from the probability map or from a classification procedure. Voxels in the candidate hot-spot can be highlighted or colored proportional to the probability of each voxel belonging to a hot-spot. For example, bright voxels that have higher probability of belonging to a hot-spot may be highlighted in bright red, and voxels with low probability could be colored light blue.

Bone Segmentation in PET-CT Images

The bone marrow has mild level of FDG uptake. Thus, the Standardized uptake value (SUV) of normal bone marrow sometimes is larger than 2.5, which is traditional cutoff threshold for malignant tumors, and thus affects detection results. For accurate detections, it is desired to segment the bone from other body parts.

Figure 16:
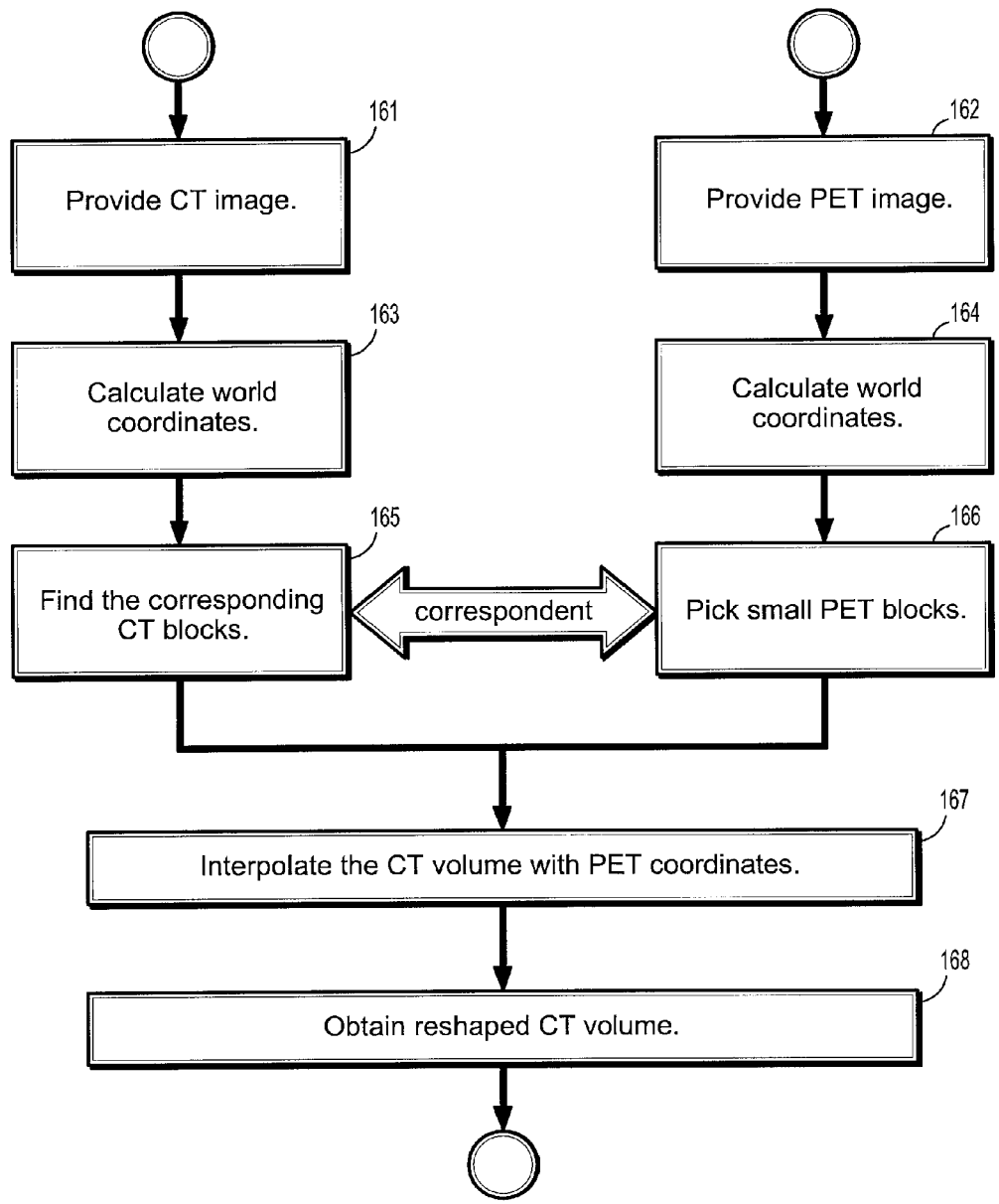
FIG. 16 is a flowchart of a bone segmentation interpolation method between voxel coordinates and the world coordinates, according to an embodiment of the invention

According to an embodiment of the invention, an algorithm for bone segmentation is based on PET-CT registration. Data is obtained from a combined PET/CT scanner that provides a registration between the two modalities. FIG. 16 depicts an interpolation diagram between voxel coordinates and the world coordinates. First, given a CT volume at step 161 and a PET volume at step 162, the world coordinates of the CT volume are calculates at step 163 and the world coordinates of the PET volume are calculated at step 164. At steps 166, one or more small PET blocks are selected, and the corresponding CT blocks are found using the above transformation. At step 167, the CT volume is interpolated with PET coordinates and the reshaped CT volume is obtained at step 168.

The challenge for bone segmentation is that, part of the outside boundary voxels can be obtained from the CT image, and the normal inside bone marrow voxels need to be removed in the PET images. With CT images, some bone voxels can be obtained by thresholding.

According to an embodiment of the invention, a series of morphological operations are used to segment the bone region. Morphological operations are basic operations. There is no assumption on the shape or any model, thus it is suitable for all kinds of PET images.

Figure 17:
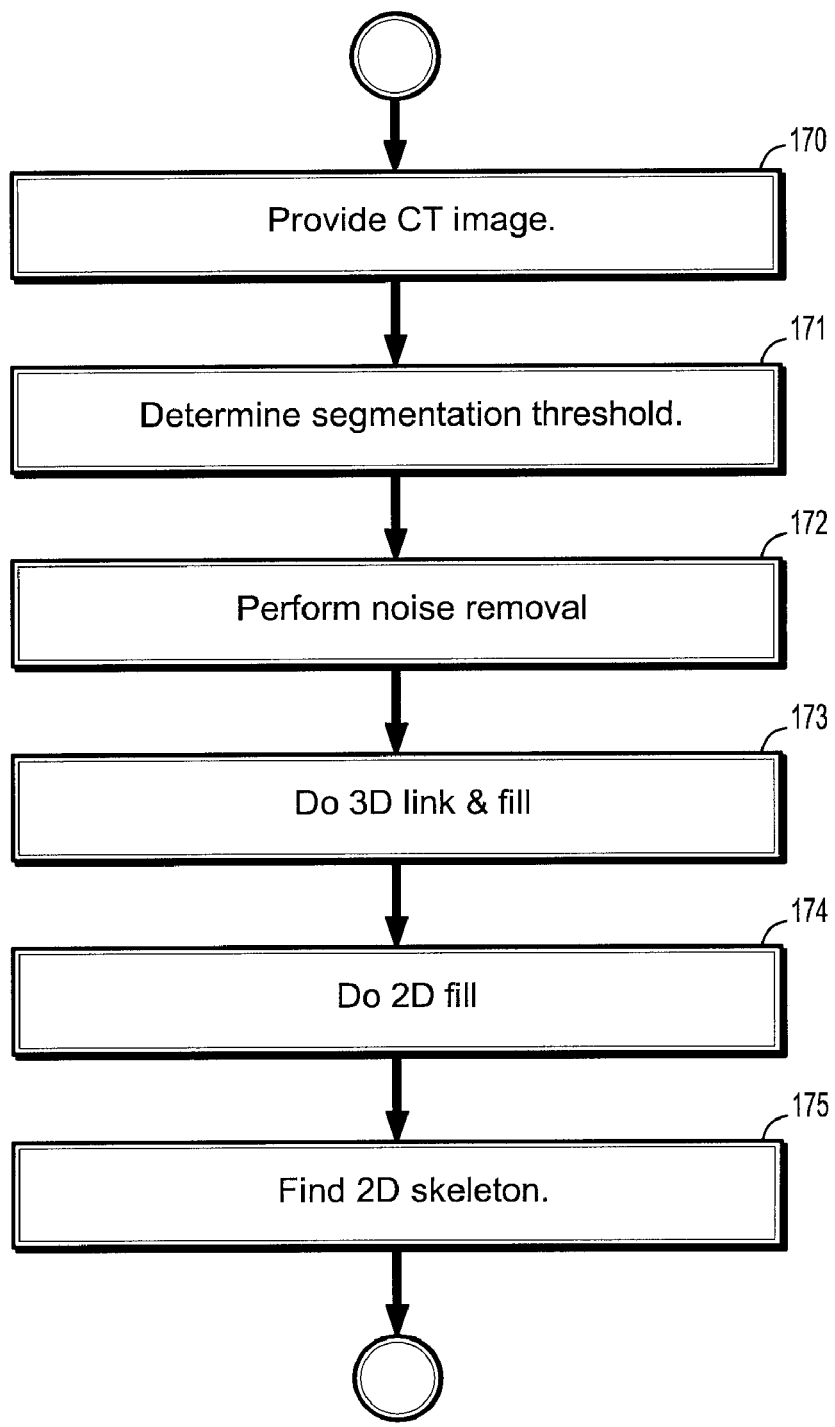
FIG. 17 is a flowchart of a bone segmentation algorithm using morphological operations, according to an embodiment of the invention.

A flowchart of a bone segmentation algorithm according to an embodiment of the invention using these morphological operations is shown in FIG. 17. Referring now to the figure, a CT image is provided for segmenting at step 170, after which a segmentation intensity threshold is determined at step 171. Then, noise is removed at step 172 by a 3D erode operation. An exemplary Matlab™ function for performing an erode operation is Morph3D with the arguments 'erode' and 2. A 3D link and fill operation is performed at step 173 to dilate the image. An exemplary Matlab™ function for performing this dilation is Imdilate, with a window size of 6×6×6. At step 174, a 2D fill operation is performed. An exemplary Matlab™ function for performing a 2D fill is bwmorph with arguments 'fill' and '10' to specify the window size. Finally, at step 175, the 2D skeleton is found. Again an exemplary Matlab™ function for doing this is bwmorph with arguments 'skel'.

Image Registration Using Detected Landmarks and Landmark Correspondences

A landmark detection framework according to an embodiment of the invention can also be applied to either implement image registration or to improve the performance of other image registration algorithms. In general, given a moving image and a fixed image that need to be registered, landmark detection is applied on both images. The landmark correspondences are produced naturally since it is known which landmarks are being detected. In a first application, the landmark correspondences can be used directly to solve either global transformations, such as rigid, similarity or affine transformations, or non-rigid deformations. When used for non-rigid registration, denser landmarks provide better performance. In a second application, a known image registration algorithm that can incorporate intensity and feature information is used to register the two images. The algorithm's input feature information can be landmarks and their correspondences are detected using an approach according to an embodiment of the invention to improve registration accuracy.

Joint Learning and Detection in Multi-Modal Images

In multi-modal images such as PET/CT, PET/MRI, or SPECT/CT, the functional and structure images are registered by the imaging hardware in a global coordinate system. Thus, training and detection steps can be performed on the two image modalities jointly. Without loss of generality, consider the example of PET/CT. The training database includes registered image volumes from both modalities. The manually labeled landmarks are valid on both PET and CT volumes since they are registered. The weighted-alignment of all training volumes applies to both PET and CT volumes. During classifier training and detection, there are several scenarios to fuse PET/CT information. In a first scenario, a discriminative classifier is trained using PET training volumes, and another discriminative classifier is trained using CT training volumes. The two classifiers choose different features that are good at differentiating positive and negative examples in the two modalities respectively. At run-time, given a new PET/CT volume pair, the PET classifier is applied to the new PET volume to detect the landmark of interest, and the CT classifier is applied to the new CT volume to detect the landmark of interest. Then the PET detection results and CT detection results are fused to prune false detections and the top candidate detection result that is valid on both the PET and the CT volumes is returned. In a second scenario, instead of training two separate classifiers (one for PET and one for CT), one single classifier can be trained using features extracted from both PET training volumes and CT training volumes. During detection, the same type of features can be extracted from both PET and CT volumes in the PET/CT pair, the trained classifier works on the "joint" features and classifies each candidate search window to be either positive or negative.

Automated Multi-Modal Object Segmentation

Multi-modal object segmentation (MMOS) uses an initial robust segmentation based on data from one medical modality to learn a model of the object that helps refine the segmentation using data from additional modality(ies) to improve the overall segmentation result. More accurate and reproducible object delineation can be achieved as a result. No user intervention is required.

MMOS performs robust object segmentation by jointly using data from multiple imaging modalities, and can perform joint whole-body PET/CT segmentation of tumors. In that particular application, an initial robust segmentation based on SUV hot-spot detection and region growing with a clinically sound interpretation is used to train a model for tumor appearance on a CT image to subsequently perform segmentation using both datasets.

A method according to an embodiment of the invention achieves improved object delineation by using data from a second imaging modality (CT) in addition to the method of choice (PET), using the segmentation result of the method of choice to learn model of tumor attenuation and shape from PET. This provides more accurate and reproducible object segmentation, while significantly reducing the demand on physician's time.

An exemplary, non-limiting application of multi-modal object segmentation is joint PET/CT segmentation. An exemplary application would be a PET image and a CT image acquired from a same patient at times points that can, from a clinical perspective, be regarded as the same time point. This encompasses situations where the different modality images are acquired a day or a week apart. Not that a method according to an embodiment of the invention can be extended to other modalities as well, such as SPECT-CT or PET-MRI.

Figure 18:
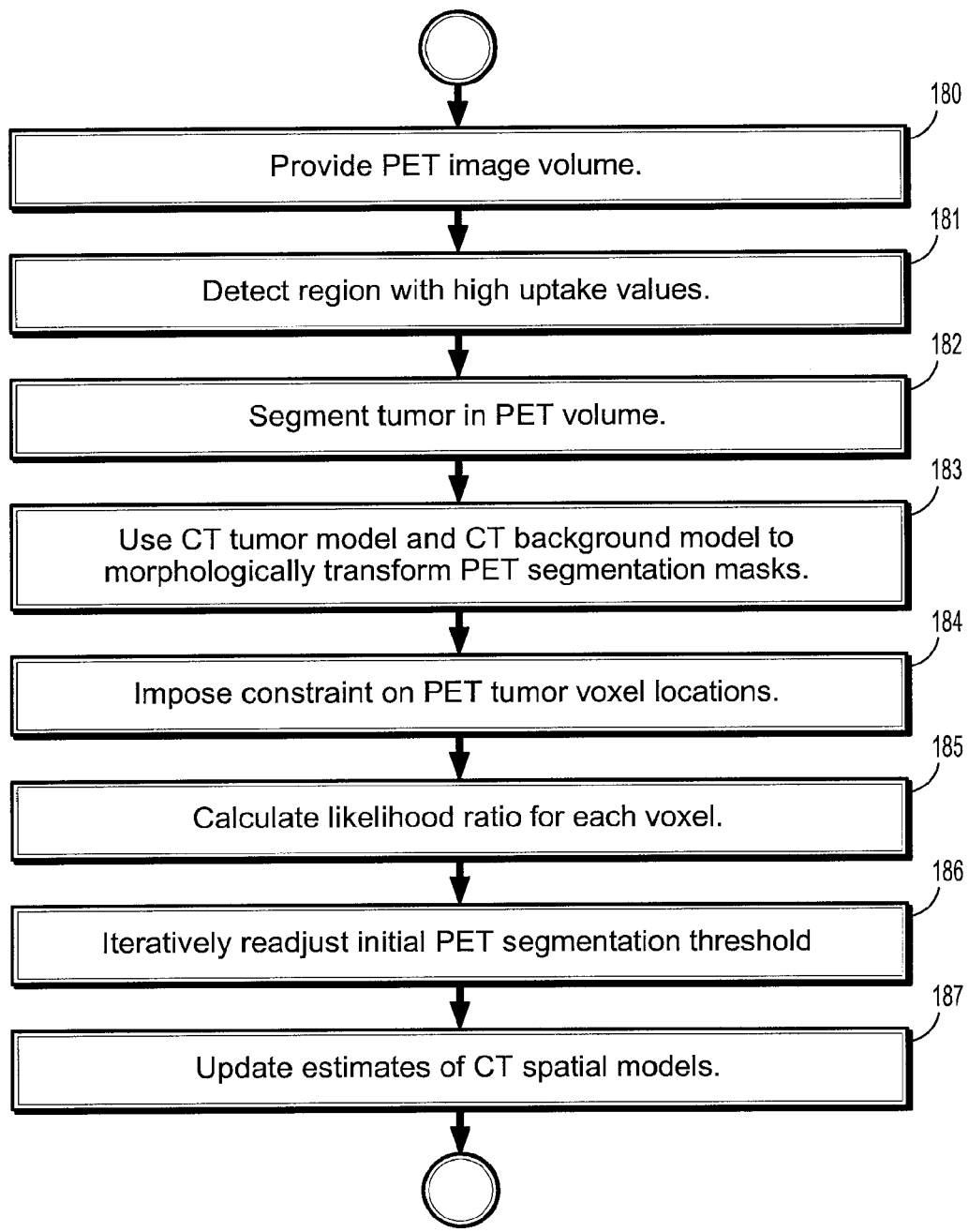
FIG. 18 is a flowchart of a multi-modal object segmentation method according to an embodiment of the invention.

A multi-modal object segmentation method according to an embodiment of the invention is shown in FIG. 18. Referring now to the figure, given a PET volume at step 180, at step 181, a region with high uptake is initially detected in PET by the physician or using an automated hot-spot detection algorithm. At step 182, the tumor is segmented in the PET volume. An exemplary segmentation method is the MSRG method according to an embodiment of the invention disclosed herein above. Mode-seeking (hill-climbing) is applied to find the maximum intensity value, such as a maximum SUV value $(SUV_{max})$ within the same connected component. Region-growing with a fixed threshold of the $SUV_{max}$ is then applied to obtain a conservative PET segmented lesion mask, $VOI_{PET}$.

At step 183, the CT lesion model and CT background model is obtained using segmented PET volume. A morphological erosion of segmented lesion mask $VOI_{PET}$ by a structuring element defined according to the size and shape of this mask produces a segmented mask $VOI_{lesion}$ considered to contain only lesion tissue. Similarly, a segmented mask $VOI_{Background}$ considered to contain only non-lesion tissue is obtained by dilating the original mask $VOI_{PET}$ and taking the logical complement of $VOI_{PET}$. Morphological operations are restricted to respect other pre-segmented structures, including body outline, heart and other detected hotspots.

A non-parameteric probabilistic model of tumor tissue attenuation in the CT image, denoted as $f(I_{CT}|VOI_{LESION})$, is obtained using the mask $VOI_{Lesion}$. Similarly, a non-parametric statistical model of the background tissue attenuation, denoted $f(I_{CT}|VOI_{BACKGROUND})$, is obtained using the mask $VOI_{Background}$. A likelihood map of lesion activity in PET is obtained by normalizing the SUV values.

To prevent the segmentation result on the CT image from moving too far away from the PET solution, a constraint on lesion voxel location is imposed at step 184 in terms of a Gaussian spatial distribution. The center, scale and anisotropy of the Gaussian are determined from the centroid and principal components of $VOI_{PET}$.

A likelihood ratio test is calculated at step 185 on a voxel-by-voxel basis in the CT image to provide a measure of voxel being lesion tissue as opposed to being background tissue, based on the CT and PET image volumes and spatial location. A likelihood ratio test r(x) can be calculated from an expression equivalent to $$\frac{\overline{P}(\text{tumor} \mid x, I_{CT}, I_{PET})}{\overline{P}(\text{backgrnd} \mid x, I_{CT}, I_{PET})}.$$

Voxels where r(x) is greater than one are labeled as lesion. Morphological closing is applied to ensure connectivity Joint use of both PET and CT data for segmentation can in theory improve lesion segmentation results compared to using PET and CT data alone. Such an approach to segmentation corresponds well to the processing of cues by an expert radiologist.

FDG-PET has a high sensitivity for detecting lesions. However, it has a relatively lower specificity, since normal tissues such as heart, muscle tissue, infection sites can also demonstrate elevated tracer uptake. Additionally, low resolution makes accurate definition of boundaries challenging due to partial volume and spill-over effects. Therefore, a conservative lesion detection and segmentation using a clinically sound threshold based on the maximum value $SUV_{max}$ may result in an incorrect delineation of lesion boundaries.

A method according to an embodiment of the invention uses the high sensitivity of PET in order to establish a "ground truth" tumor mask to learn a model of CT tumor and background attenuation based on the initial PET segmentation. The joint use of CT and PET likelihood functions of a voxel being tumor tissue as opposed to background tissue permits more accurate delineate of object boundaries.

A method according to an embodiment of the invention can be further extended to iteratively re-adjust the initial PET segmentation threshold at step 186 and calculate update estimates of the CT spatial models $f(I_{CT}|VOI_{LESION})$ and $f(I_{CT}|VOI_{BACKGROUND})$ at step 187. Spatial agreement and connectivity between PET, CT likelihood maps can be imposed using methods such as conditional random fields.

A method according to an embodiment of the invention can be further extended to include additional imaging modalities, or be customized to particular applications (e.g. lung imaging) by including application-specific models and constraints, and can be combined with existing segmentation algorithms and classifiers.

Building Statistical Atlases Using Detected Landmarks

A learning framework according to an embodiment of the invention can also be integrated with generative atlas-based image interpretation methods. After detecting the rough location of an organ, a statistical shape or appearance model based on the detection result can be initialized, after which the model deforms to fit to the exact boundary of the organ. Once there is a whole-body atlas, the atlas can be registered to a new volume based on a few detected landmarks. The atlas can provide information about neighborhoods in which other landmarks might be located, improving the speed of detection of other landmarks. Full-body segmentation can be performed by combining whole-body landmark detection with atlas registration or fitting.

In addition, having the whole-body landmarks and regional segmentations allows one to compare intensity (e.g. hounsfield unit values in CT images, FDG-uptake or SUV values in PET images) statistics between regions. For instance, after detecting and segmenting the liver, one can compare the SUV values of the liver to that of the lung, or to that of the whole body.

Detection of Landmarks in Each Volume of a Set of Whole-Body Volumes of the Same Patient at Several Different Time Points In a situation where there exits whole-body volumes of the same patient at several different time points, a landmark detection algorithm according to an embodiment of the invention can be used to detect landmarks in each volume, hence establishing correspondences between landmarks at different time points. These landmarks correspondences can be used to register these volumes taken at different time points. Another application is that, given an arbitrary click point in one volume, predicting where its correspondence should be in other volumes over time. This can be achieved using the detected landmarks as the click point's context features, and using landmark correspondences to predict the click point's correspondence. Local or regional change quantification can also be achieved by first detecting the local regions of interest then quantifying changes within those local regions.

System Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 19:
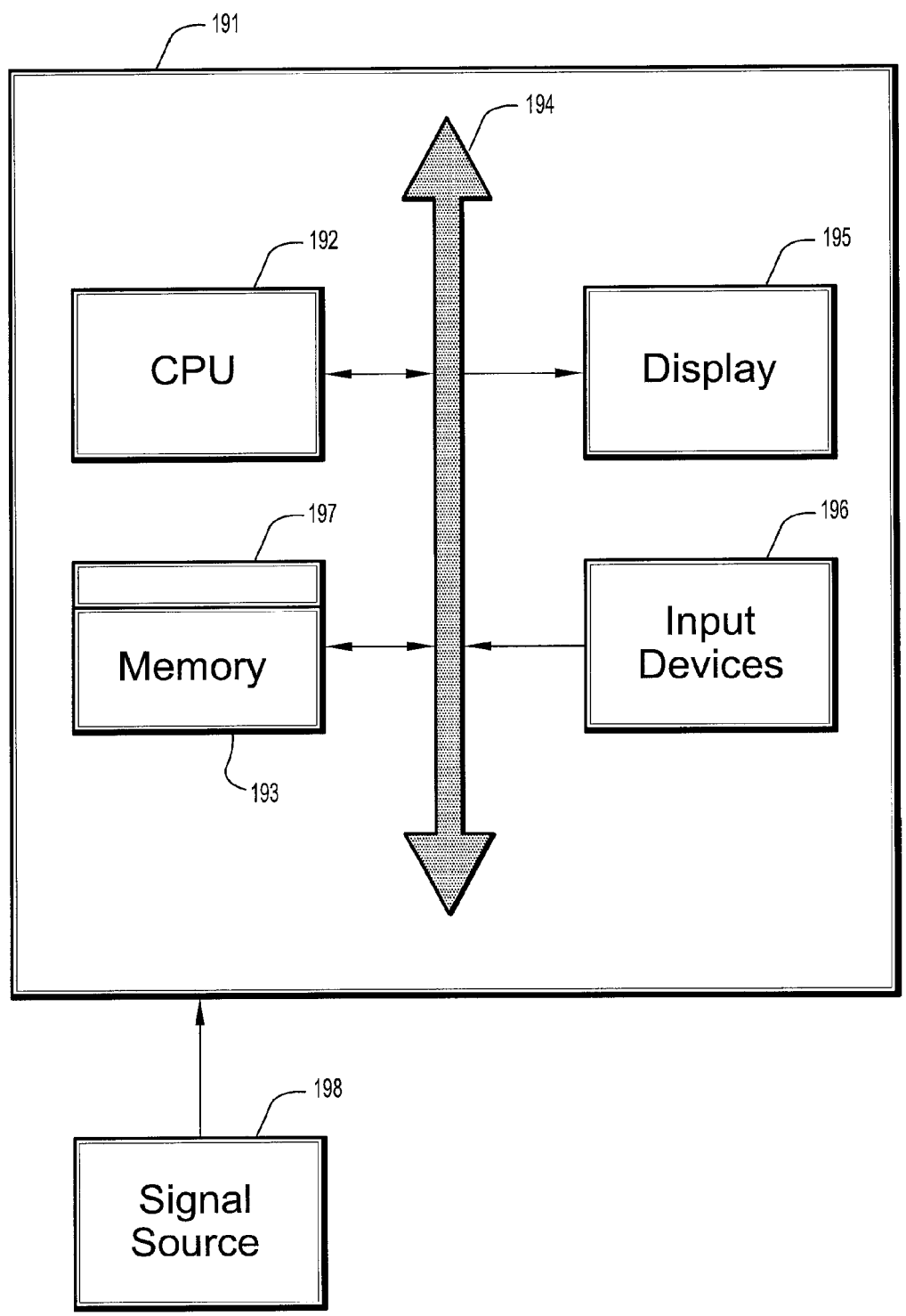
FIG. 19 is a block diagram of an exemplary computer system for implementing a learning-based framework for whole-body landmark detection, segmentation, and change quantification, according to an embodiment of the invention.

FIG. 19 is a block diagram of an exemplary computer system for implementing a learning-based framework for whole-body landmark detection, segmentation, and change quantification in single-mode and multi-mode medical images, according to an embodiment of the invention. Referring now to FIG. 19, a computer system 191 for implementing the present invention can comprise, inter alia, a central processing unit (CPU) 192, a memory 193 and an input/output (I/O) interface 194. The computer system 191 is generally coupled through the I/O interface 194 to a display 195 and various input devices 196 such as a mouse and a keyboard. The support circuits can include circuits such as cache, power supplies, clock circuits, and a communication bus. The memory 193 can include random access memory (RAM), read only memory (ROM), disk drive, tape drive, etc., or a combinations thereof. The present invention can be implemented as a routine 197 that is stored in memory 193 and executed by the CPU 192 to process the signal from the signal source 198. As such, the computer system 191 is a general purpose computer system that becomes a specific purpose computer system when executing the routine 197 of the present invention.

The computer system 191 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting digitized images using a processor to perform the steps comprising:
   providing a training set comprising a plurality of digitized whole-body images, each image comprising a plurality of intensities corresponding to a domain of points on an 3-dimensional grid;
   providing labels on anatomical landmarks in each image of said training set;
   aligning each said training set image to a common target volume;
   generating positive and negative training examples for each landmark by cropping the aligned training volumes into at least one cropping window;
   using said positive and negative examples to train a detector for each landmark at a plurality of spatial scales ranging from a coarse resolution to a fine resolution; and
   testing said detector on a validation set of digitized whole-body images, wherein false positives are added into the negative training examples and false negatives are added into the positive training examples, wherein said detector is re-trained using said positive and negative examples.

2. The method of claim 1, wherein the at least one cropping window is a plurality of cropping windows of different spatial scales and wherein the spatial relationship between cropping windows of a coarse resolution detector and a fine resolution detector is recorded.

3. The method of claim 1, further comprising providing a new digitized image and a set of search window parameters and using at least one of said detectors to search for its associated landmark in said new image, and classifying the sub-volume within the search window as either as positive example that contains said landmark, or a negative example that does not contain said landmark.

4. The method of claim 1, wherein a positive training example is generated by cropping a largest size landmark neighborhood to train a coarse-level detector, training a succession of higher resolution detectors on a succession of decreasing sized neighborhoods centered at the landmark.

5. The method of claim 4, wherein a negative training example is generated by pre-selecting a sample from a training volume at each resolution for which a positive example is generated, wherein pre-selecting includes one or more of cropping a training volume at a location not centered on an anatomical landmark, cropping sub-volumes of a training volume at different spatial scales, and rotating a sub-volume.

6. The method of claim 1, wherein aligning each training set image to a common target volume further comprises calculating transformations based on landmark correspondences, wherein a higher weight is given to those landmarks with less size and shape variability among the anatomical landmarks labeled in the training set.

7. A program storage device readable by a computer, tangibly embodying a program of instructions executable by the computer to perform the method steps for segmenting digitized images, said method comprising the steps of:

provided a training set comprising a plurality of digitized whole-body images, each image comprising a plurality of intensities corresponding to a domain of points on an 3-dimensional grid;

providing labels on anatomical landmarks in each image of said training set;

aligning each said training set image to a common target volume;

generating positive and negative training examples for each landmark by cropping the aligned training volumes into at least one cropping window; and using said positive and negative examples to train a detector for each landmark at a plurality of spatial scales ranging from a coarse resolution to a fine resolution, wherein the spatial relationship between a cropping window of a coarse resolution detector and a fine resolution detector is recorded.

8. The computer readable program storage device of claim 7, the method further comprising providing a plurality of new digitized images, said images representing a same patient at different time points;

selecting a point in a sub-volume of interest in each of said plurality of images;

segmenting said sub-volume of interest in each image; and quantifying changes in the sub-volume of interest over the different images of one or more properties including intensity, volume, shape, topology, location, and texture.

9. The computer readable program storage device of claim 7, the method further comprising providing a digitized whole-body image, said image comprising a plurality of intensities corresponding to a domain of points on an 3-dimensional grid;

calculating one or more characteristic feature functions of said body for each axial slice in said image; and analyzing said one or more characteristic feature functions to label the body slices according to their anatomical regions.

10. The computer readable program storage device of claim 7, the method further comprising providing a training set comprising a plurality of digitized whole-body images, each image comprising a plurality of intensities corresponding to a domain of points on an 3-dimensional grid;

providing contours to delineate anatomical landmarks on said training images;

fitting each delineated anatomical landmark to a Gaussian function and determining a distance d from the center of each said Gaussian to said contour from $d=Kc$, wherein c is the width of the Gaussian; and averaging K across all slices of all training images, wherein a segmentation threshold for said anatomical landmark is determined from a Gaussian function of $(b-Kc)$, wherein b is a centroid location.

11. The computer readable program storage device of claim 7, the method further comprising providing a plurality of digitized images acquired through differing modalities at the same clinical time point of a same patient, each said image comprising a plurality of intensities corresponding to a domain of points on an 3-dimensional grid;

segmenting a region-of-interest in a first of said plurality of images;

propagating said segmented region of interest to the rest of said plurality of images based on the spatial relationship between said first image and the rest of said plurality of images; and updating the segmentation in each of the rest of said plurality of images according to one or more of spatial or intensity features in each of the rest of said plurality of images.

* * * * *